(12) United States Patent
Yamamoto

(10) Patent No.: US 8,306,321 B2
(45) Date of Patent: Nov. 6, 2012

(54) IMAGE PROCESSING METHOD OF COMPRESSING IMAGE DATA TO BE SUITABLE FOR DATA TRANSMISSION

(75) Inventor: Toshitsugu Yamamoto, Takatsuki (JP)

(73) Assignee: Konica Minolta Business Technologies, Inc. (JP)

( * ) Notice: Subject to any disclaimer, the term of this patent is extended or adjusted under 35 U.S.C. 154(b) by 554 days.

(21) Appl. No.: 12/560,742

(22) Filed: Sep. 16, 2009

(65) Prior Publication Data

US 2010/0067790 A1     Mar. 18, 2010

(30) Foreign Application Priority Data

Sep. 17, 2008   (JP) ................................. 2008-238314

(51) Int. Cl.
*G06K 9/36* (2006.01)
*G06K 9/00* (2006.01)
*G03F 3/08* (2006.01)

(52) U.S. Cl. ........ 382/166; 382/167; 382/232; 382/251; 358/518; 358/521

(58) Field of Classification Search .................. 382/232, 382/166, 167, 251; 358/518, 512
See application file for complete search history.

(56) References Cited

U.S. PATENT DOCUMENTS

| 7,162,077 | B2 * | 1/2007 | Li ................................. | 382/166 |
| 2002/0021834 | A1 * | 2/2002 | Kojima et al. ................. | 382/164 |
| 2008/0062480 | A1 * | 3/2008 | Iizuka et al. ................... | 358/518 |
| 2009/0021521 | A1 * | 1/2009 | Sorgard et al. ................ | 345/582 |

FOREIGN PATENT DOCUMENTS

| JP | 08-115405 A | 5/1996 |
| JP | 2001-338284 A | 12/2001 |
| JP | 2008-92551 A | 4/2008 |

OTHER PUBLICATIONS

Japanese Office Action, Notice of Grounds of Rejection for Japanese Patent Application No. 2008-238314 mailing date of Feb. 7, 2012 with English Translation.

* cited by examiner

*Primary Examiner* — Anand Bhatnagar
*Assistant Examiner* — Soo Park
(74) *Attorney, Agent, or Firm* — Cantor Colburn LLP

(57) ABSTRACT

An image processing apparatus executes an area dividing process on color image data that have been divided into blocks of a prescribed size, and for each block, selects a three-color mode when tone gradation is of higher priority and a four-color mode when resolution is of higher priority, as a color mode for an area averaging process. The image processing device executes a compression process in the selected color mode block by block, and outputs image data in a data format of 256 bit length, regardless of the color mode for compression.

12 Claims, 23 Drawing Sheets

FIG.7

| TAG-BIT INFORMATION (2 BITS) | TAG BIT CONTENTS | colorV |
|---|---|---|
| 11 | PHOTOGRAPH | 0 |
| 10 | CHART | 200 |
| 01 | CHARACTER | 390 |
| 00 | UNUSED | – |

FIG.9

AREA 0

| 01 | 01 | 01 | 00 | 00 | 01 | 01 | 01 |
| 01 | 01 | 01 | 00 | 00 | 01 | 01 | 01 |
| 01 | 01 | 01 | 00 | 00 | 01 | 01 | 01 |
| 01 | 01 | 01 | 00 | 00 | 01 | 01 | 01 |
| 01 | 01 | 01 | 00 | 00 | 01 | 01 | 01 |
| 01 | 01 | 01 | 00 | 00 | 01 | 01 | 01 |
| 01 | 01 | 01 | 00 | 00 | 01 | 01 | 01 |
| 01 | 01 | 01 | 00 | 00 | 01 | 01 | 01 |

AREA 1

FIG.10

AREA 1          AREA 0

| 01 | 01 | 01 | 00 | 00 | 01 | 10 | 10 |
| 01 | 01 | 01 | 00 | 00 | 10 | 10 | 10 |
| 01 | 01 | 01 | 00 | 00 | 10 | 10 | 10 |
| 01 | 01 | 01 | 00 | 00 | 10 | 10 | 10 |
| 01 | 01 | 10 | 00 | 00 | 10 | 10 | 10 |
| 01 | 10 | 10 | 00 | 00 | 10 | 10 | 10 |
| 10 | 10 | 10 | 00 | 00 | 10 | 10 | 10 |
| 10 | 10 | 10 | 00 | 00 | 10 | 10 | 10 |

AREA 2

FIG.16

| AREA 1 | | | AREA 0 | | | AREA 2 | |
|---|---|---|---|---|---|---|---|
| 01 | 01 | 01 | 00 | 00 | 01 | 10 | 10 |
| 01 | 01 | 01 | 00 | 00 | 10 | 10 | 10 |
| 01 | 01 | 01 | 00 | 00 | 10 | 10 | 10 |
| 01 | 01 | 01 | 00 | 00 | 10 | 10 | 10 |
| 01 | 01 | 10 | 00 | 00 | 10 | 10 | 11 |
| 01 | 10 | 10 | 00 | 00 | 10 | 11 | 11 |
| 10 | 10 | 10 | 00 | 00 | 11 | 11 | 11 |
| 10 | 10 | 10 | 00 | 00 | 11 | 11 | 11 |
| | | AREA 2 | | | | AREA 3 | |

FIG.17

| AREA 1 | | | AREA 0 | | | AREA 2 | |
|---|---|---|---|---|---|---|---|
| 01 | 01 | 01 | 00 | 00 | 01 | 10 | 10 |
| 01 | 01 | 01 | 00 | 00 | 10 | 10 | 10 |
| 01 | 01 | 01 | 00 | 00 | 10 | 10 | 10 |
| 01 | 01 | 01 | 00 | 00 | 10 | 10 | 10 |
| 01 | 01 | 10 | 00 | 00 | 10 | 10 | 11 |
| 01 | 10 | 10 | 00 | 00 | 10 | 11 | 11 |
| 10 | 10 | 10 | 00 | 00 | 11 | 11 | 11 |
| 10 | 10 | 10 | 00 | 00 | 11 | 11 | 11 |

AREA 2     AREA 3

FIG.21

□ : TABLE OBTAINED BY CONVERTING 6-BIT-REDUCED DATA TO 8-BIT DATA

□ : FOR REFERENCE (EXAMPLE 1)
IF Y REPRESENTATIVE VALUE IS
| 00111110(62) |

OUTPUT 6-BIT-REDUCED DATA 001111 OF WHICH ABSOLUTE VALUE OF DIFFERENCE FROM THE TABLE IS MINIMUM (EXAMPLE 2)
IF Y REPRESENTATIVE VALUE IS
| 11000001(193) |

OUTPUT 6-BIT-REDUCED DATA 110000 OF WHICH ABSOLUTE VALUE OF DIFFERENCE FROM THE TABLE IS MINIMUM

| 0000000(0) |
| 00000001(1) |
| 00000010(2) |
| 00000011(3) |
| 00000100(4) |
| 00000101(5) |
| 00000110(6) |
| 00000111(7) |
| 00001000(8) |
| 00001001(9) |
| ... |
| 00111100(60) |
| 00111101(61) |
| 00111110(62) |
| 00111111(63) |
| 01000000(64) |
| 01000001(65) |
| 01000010(66) |
| 01000011(67) |
| 01000100(68) |
| 01000101(69) |
| ... |
| 01111101(125) |
| 01111110(126) |
| 01111111(127) |
| 10000000(128) |
| 10000001(129) |
| 10000010(130) |
| 10000011(131) |
| 10000100(132) |
| 10000101(133) |
| 10000110(134) |
| ... |
| 10111110(190) |
| 10111111(191) |
| 11000000(192) |
| 11000001(193) |
| 11000010(194) |
| 11000011(195) |
| 11000100(196) |
| 11000101(197) |
| 11000110(198) |
| 11000111(199) |
| ... |
| 11110111(247) |
| 11111000(248) |
| 11111001(249) |
| 11111010(250) |
| 11111011(251) |
| 11111100(252) |
| 11111101(253) |
| 11111110(254) |
| 11111111(255) |

← LARGER VALUE IS OUTPUT IF DIFFERENCE IN ABSOLUTE VALUE IS THE SAME

# IMAGE PROCESSING METHOD OF COMPRESSING IMAGE DATA TO BE SUITABLE FOR DATA TRANSMISSION

This application is based on Japanese Patent Application No. 2008-238314 filed with the Japan Patent Office on Sep. 17, 2008, the entire content of which is hereby incorporated by reference.

BACKGROUND OF THE INVENTION

1. Field of the Invention

The present invention relates to an image processing method, an image processing apparatus and a computer readable recording medium recording an image processing program. Specifically, it relates to an image processing method for compressing image data, an image processing apparatus performing a process for compressing image data, and a computer readable recording medium recording an image processing program for causing a computer to execute a process for compressing image data.

2. Description of the Related Art

When image data is compressed in accordance with BTC (Block Truncation Coding) method, a balance between size of compression and image quality is determined depending on a block size and the number of representative colors.

When compressed data is subjected to editing process such as rotation, speed of processing significantly lowers if data size of image data after compression exceeds 32 byte border, up to which good data transfer efficiency is possible. The inventors disclosed, in Japanese Laid-Open Patent Publication No. 2008-092551, an image processing technique of adding, to an image, image processing information to be utilized in image processing. Using this technique, however, the data size of image data after compression exceeds 32 bytes, undesirably lowering the data transfer efficiency.

If the number of representative colors is reduced at the time of compression in order to reduce data size of the compressed data, however, image performance of an image, for example, including high-frequency component such as an opaque image, would be lost. If tone gradation is reduced, image quality degrades. As to the opaque image mentioned above, is it possible to set an object in an image to be semi-transparent by, for example, a word-processing software, and an opaque image refers to an image including such an object set to be semi-transparent.

SUMMARY OF THE INVENTION

The present invention was made in view of the above-described problem and an object of the invention is to provide an image processing method, an image processing apparatus and a computer readable recording medium storing an image processing program, that enable compression of image data to a data size allowing efficient data transfer while maintaining image quality.

In order to attain the above-described object, according to an aspect, the present invention provides a method of processing input image data in an image processing apparatus, including the steps of: dividing a block of a prescribed size of the input image data into a plurality of areas; calculating, for each of the divided areas, a representative color of the area; and representing the block as output data including a color palette indicating the representative color and information indicating the area to which each pixel in the block belongs, and outputting the output data. At the step of dividing into areas, for each block of the input image data, the number of areas after division of the block is determined, and the block is divided into the determined number of areas.

According to another aspect, the present invention provides an image processing apparatus, including: an input device for receiving input of image data; and a processing device performing a process for compressing the image data, and outputting compressed data. The processing device compresses the image data by (i) determining number of areas after division, for each block of a prescribed size of the input image data, (ii) dividing the block into the determined number of areas, (iii) calculating a representative color of the area, for each of the areas, and (iv) representing the block as an output data including a color palette indicating the representative color and information indicating an area to which each pixel of the block belongs, and outputting the data as the compressed data.

According to a further aspect, the present invention provides a computer readable medium recording a program causing a computer to execute a process on input image data. The process includes the steps of: dividing a block of a prescribed size of the input image data into a plurality of areas; for each of the divided areas, calculating a representative color of the area; and representing and outputting the block as output data including a color palette indicating the representative color and information indicating an area to which each pixel in the block belongs. At the step of dividing into areas, for each block of the input image data, the number of areas after division of the block is determined, and the block is divided into the determined number of areas.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows specific examples of values added at the time of weighting of tag-bit information.

FIGS. 9 and 10 show the image on the upper right side of FIG. 3 after the first area division process and after the second area division process, respectively.

FIG. 16 shows the image on the upper right side of FIG. 3 after the third area division process.

FIG. 17 shows the image of FIG. 16 after the four-color mode process.

FIGS. 20 and 21 illustrate a process included in the process shown in FIG. 19.

DESCRIPTION OF THE PREFERRED EMBODIMENTS

Figure 1:
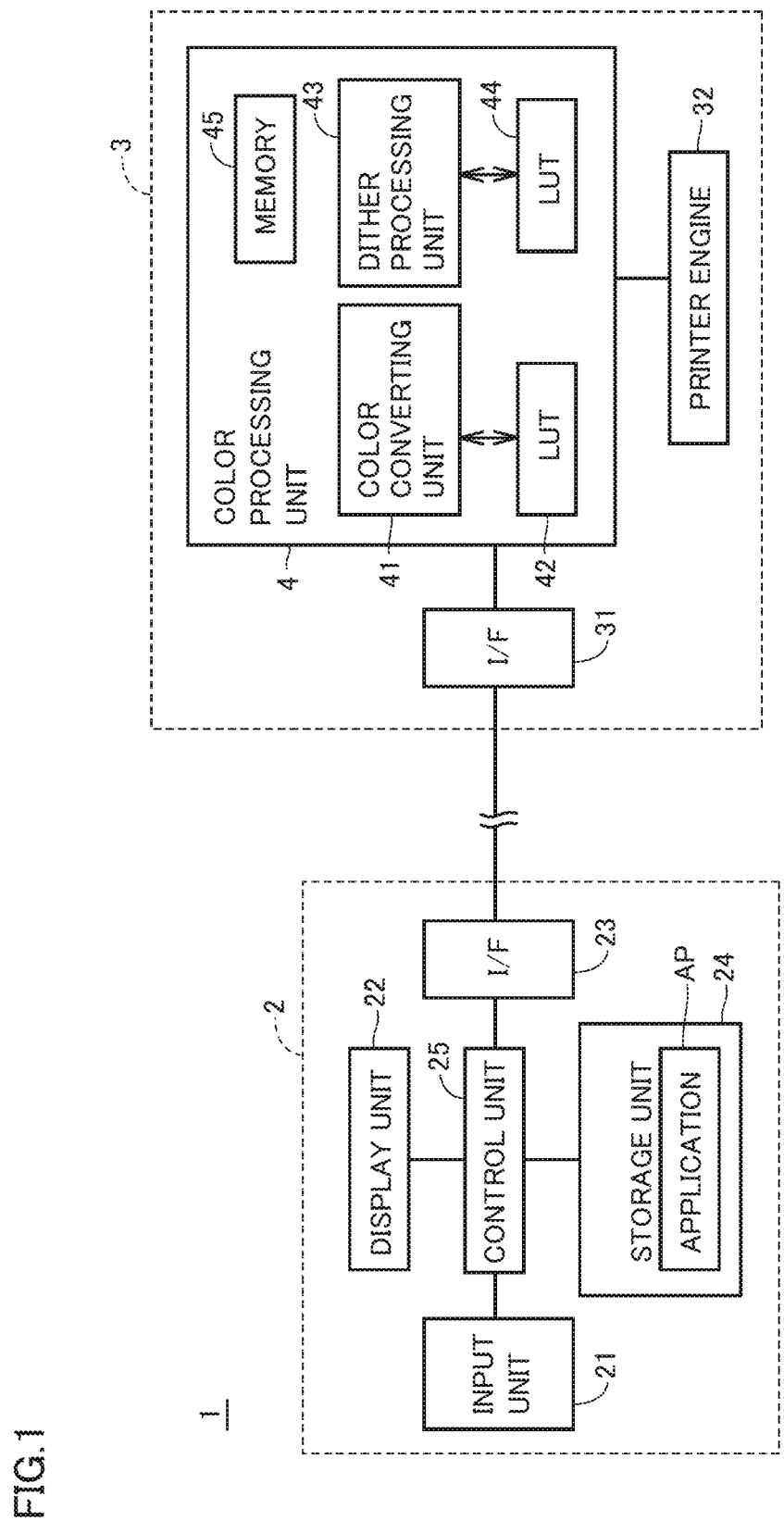
FIG. 1 is a block diagram showing a specific example of a configuration of image processing system in accordance with an embodiment.

In the following, embodiments of the present invention will be described with reference to the figures. In the following description, the same parts and components are denoted by the same reference characters. Their names and functions are also the same.

FIG. 1 shows an image processing system (hereinafter referred to as a system) 1 in accordance with the present embodiment, including a personal computer (hereinafter referred to as a PC) 2 and a printer 3 connected to PC 2.

PC 2 includes an input unit 21 such as a mouse and a keyboard, a display unit 22 such as a liquid crystal display, an interface (I/F) unit 23 for transmitting data such as print data to printer 3, a storage unit 24 such as a hard disk, and a control unit 25 including a CPU (Central Processing Unit) and a memory, for overall control of the apparatus. Storage unit 24 stores applications AP such as software having a word-processor function allowing input/edition of characters and images and outputting results to printer 3.

Printer 3 is, by way of example, implemented by a page printer. Printer 3 includes an interface (I/F) unit 31 for communication with PC 2, a color processing unit 4, and a printer engine 32 for printing data processed by color processing unit 4 to a sheet of paper (paper medium).

Color processing unit 4 is a processing device including a CPU, not shown, and a memory 45. When a program stored in memory 45 is read and executed by the CPU, color processing is performed on the print data received from PC 2. Color processing unit 4 includes a color converting unit 41, a dither processing unit 43, and look-up table (LUT) units 42 and 44. Memory 45 temporarily stores image data, in addition to the program mentioned above. Color converting unit 41 and dither processing unit 43 may be implemented as software configuration formed in the CPU as the CPU executes the program, or may be implemented as hardware configuration such as an electric circuit included in color processing unit 4 as a processing device.

Look-up table (LUT) unit 42 stores a look-up table (LUT) used for color conversion at color converting unit 41, and look-up table (LUT) unit 44 stores a look-up table (LUT) used for dither processing at dither processing unit 43.

Color converting unit 41 selects an appropriate color conversion table from the look-up table (LUT), which includes a plurality of conversion tables (color conversion tables) for performing color conversion, held in look-up table (LUT) unit 42 based on tag-bit information representing the type (text, chart, photograph, and the like) of the image. Based on the selected color conversion table, color converting unit 41 converts RGB (Red, Green, Blue) tone image data as print data transmitted from PC 2, to CMYK (Cyan, Magenta, Yellow, Black) tone image data.

Dither processing unit 43 selects an appropriate dither processing table from the look-up table (LUT), which includes a plurality of conversion tables (dither conversion tables) for performing dither processing, held in look-up table (LUT) unit 44 based on the tag-bit information added to the image. Based on the selected dither processing table, dither processing unit 43 performs a half-tone process (screening process) on the CMYK tone image generated by color converting unit 41. This process is also referred to as dither processing.

With these functions, color processing unit 4 performs the process of dividing color image data of 1 page input from PC 2 to printer 3 to a plurality of blocks (areas), successively extracting an image corresponding to each divided block (hereinafter referred to as a block image), reducing colors of the block image to a number of colors smaller than the number of pixels of the block image and thereby compressing the image.

The compressed image data is temporarily stored in memory 45, and transferred at a prescribed timing from memory 45 to printer engine 32, to be printed.

First Embodiment

Principle of Compression

The principle of compression at color processing unit 4 in accordance with the first embodiment will be described, using a specific example in which one block consists of 8 pixels×8 pixels=64 pixels. Color processing unit 4 switches, block by block, between a four-color mode compression (color reduction) process (hereinafter referred to as four-color mode process) and a three-color mode compression (color reduction) process (hereinafter referred to as three-color mode process). The four-color mode process in accordance with the first embodiment will be described with reference to FIG. 2.

Figure 2:
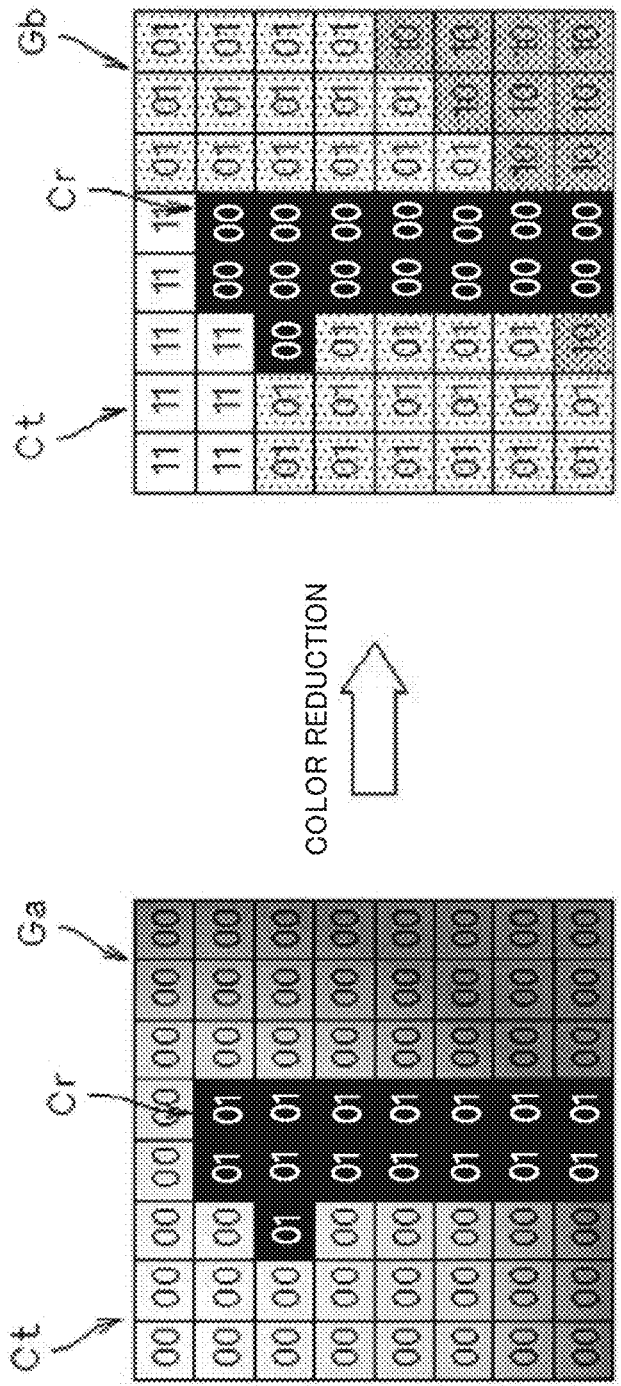
FIGS. 2 and 3 are illustrations of a four-color mode process in accordance with a first embodiment.
Figure 3:
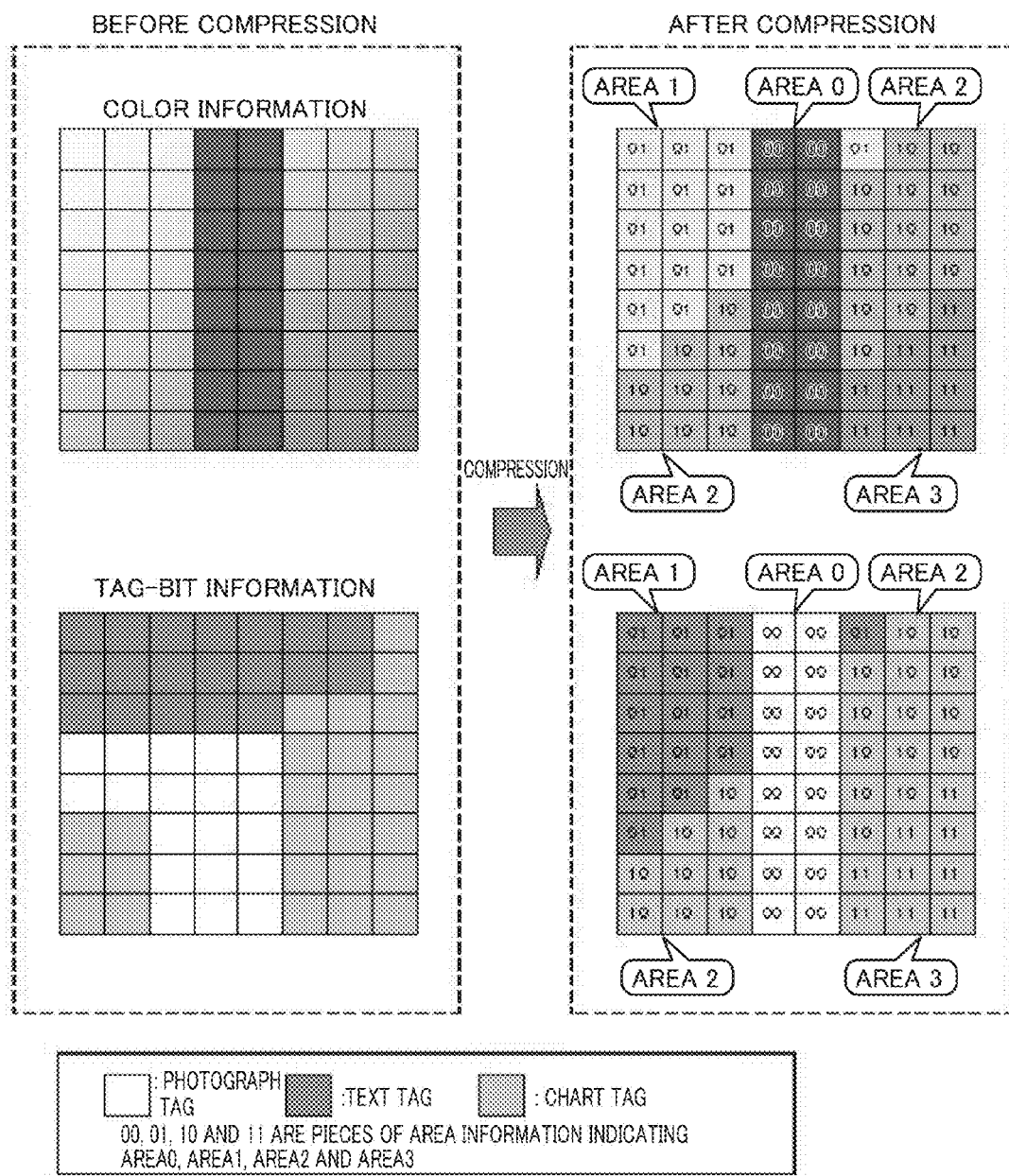

Color processing unit 4 cuts out 1 block (8 pixels×8 pixels) from the image as an object of processing. Referring to FIG. 2, print data of image Ga transmitted from PC 2 and divided into blocks has color information (color data) of each pixel of image Ga and tag-bit information added to each pixel, represented by numerals "00", "01". Since one block consists of 64 pixels, data amount, for example, of RGB color data of one block is 8 bits×3 colors×64 pixels=1536 bits. Further, tag-bits, which will be described later, are added, 2 bits per 1 pixel. Therefore, the data amount of tag-bit information for one block is 2 bits×64 pixels=128 bits. As a result, the sum of data amounts of color data and tag-bit information corresponding to one block is 1664 bits. Though the tag-bit information is shown as integral part of the image in FIG. 2, actually, the tag-bit information is managed as separate data from the image, as shown in FIG. 3. The upper left part of FIG. 3 represents CMYK data of the divided image, and the lower left part represents the tag-bit information. The upper right part of FIG. 3 represents the CMYK data after compression, and the lower right part represents the tag-bit information after compression.

The image Ga is divided to a "character" portion Cr formed of pixels having tag-bit information of "01" and a "chart" portion Ct formed of pixels having tag-bit information of "00". It is assumed that the "character" portion has a single color (for example, black) and the "chart" portion is colored with gradations.

When a color reduction process of reducing the number of colors to four, that is, the four-color mode process, is to be done on the image Ga by color processing unit 4, color processing unit 4 allocates a color to each pixel, and generates an image Gb in which an index ("00", "01", "10" or "11") representing the allocated color is added to each pixel. Specifically, color processing unit 4 determines four representative colors (for example one color for character portion Cr and three colors for chart portion Ct) from the image Ga. Then, an image Gb is formed, in which an index representing any one of these four colors is added to each pixel of image Ga. At this compression process, a color palette describing color information of each of the reduced four colors is formed.

The color (information) added to a pixel is closely related to the tag-bit information. Therefore, color processing unit 4 adds the tag-bit information to the color palette. Specifically, color processing unit 4 forms a color palette (combined information table), which includes combinations of color information of each of the reduced four colors and the tag-bit information (image processing information) to be used for the color conversion process and the like performed color by color. This color palette allows easier handling of tag-bit information.

If the tag-bit information and the color added in the compression process are not in one-to-one correspondence, that is, if a group of pixels having the same color added thereto include a plurality of different pieces of tag-bit information (for example, "character" and "chart"), the tag-bit information of the group may be changed uniformly to the tag-bit information corresponding to a larger number of pixels. Alternatively, by dividing piece-by-piece of tag-bit information rather than color-by-color, the overall number of divisions may be set to a prescribed number (for example, 4). If the image data as the object of processing is RGB data, by the compression process described above, the data amount of image data of one block is reduced to the sum of 2 bits×64 pixels=128 bits for the index representing the information of area to which each pixel belongs (code representing areas 0 to 3), 8 bits×3 colors×4 areas=96 bits for the color data of each area, and 2 bits×4 areas=8 bits for the tag-bit information added to each area, that is, a total of 232 bits, which is smaller than the data transfer unit of 256 bits.

If the data as the object of processing is CMYK data, by the color reduction to four colors, the data amount will be the sum of index (2 bits×64 pixels)+color data (8 bits×4 colors×4 areas)+tag-bit information (2 bits×4 areas)=264 bits, which is larger by 8 bits than the data transfer unit of 256 bits. Therefore, color processing unit 4 performs the three-color mode process in which the number of colors is reduced to three, in an area that needs tone gradation, and in place of storing information of the fourth color in a storage area, tag-bits corresponding to three areas are stored in that area. As a result, the data amount becomes the sum of index (2 bits×64 pixels)+color data (8 bits×4 colors×3 areas)+tag-bit information (2 bits×3 areas)=230 bits. On the other hand, in an area that needs resolution, color processing unit 4 executes the four-color mode process, in which the number of colors is reduced to four, by which data amount of color value of any one of CMYK, preferably Y (yellow) that is most difficult for a person to recognize, is reduced by 2 bits, and the tag-bit information of four areas is stored in the corresponding storage area. As a result, the data amount becomes the sum of index (2 bits×64 pixels)+color data (CMK (8 bits×3 colors)+Y (6 bits×1 color)×4 areas)+tag-bit information (2 bits×4 areas)=256 bits.

<Outline of Color Reduction Algorithm>

In the compression process, color processing unit 4 reduces the number of colors in one block to three or four, and the color of the block is represented by these colors. Specifically, if the number of colors in one block is three or smaller and the colors are clearly separated pixel by pixel, color processing unit 4 maintains the color of each pixel unchanged. If the number of colors in one block is four and the colors are clearly separated pixel by pixel, color processing unit 4 reduces the data amount of Y to 6 bits. If there are five or more colors in one block, color processing unit 4 forms a group of close colors, and selects a color that represents the colors in the group. When the representative color is selected, not only the closeness of colors but also the number of pixels included in the group is considered.

Figure 4:
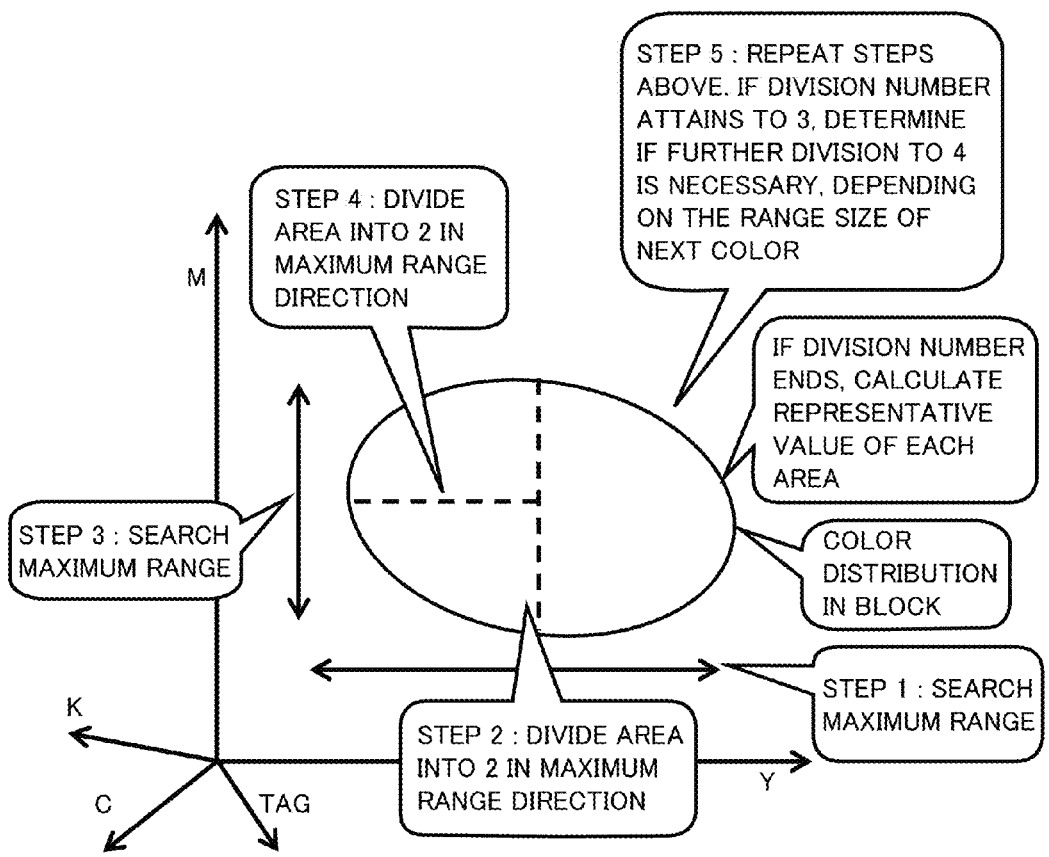
FIG. 4 illustrates a color reduction algorithm used in the first embodiment.

The color reduction algorithm as such will be specifically described with reference to FIG. 4, using an example in which the image data as the object of processing is CMYK data. FIG. 4 represents distribution of colors of one block of CMYK data, in a color space. Color processing unit 4 divides distributed colors into four groups, and by averaging colors belonging to each group, determines a representative color.

Grouping is done through the following steps 1 to 5. Specifically:

Step 1: The degree how a color changes is found, in each of a total of five directions, that is, four directions along coordinate axes+tag axis direction. The direction in which the degree of change is the largest (maximum range) is searched. At this time, the amount of change is corrected taking into account the colors and the number of pixels included in the area.

Step 2: The area is divided into two in the direction of maximum range (for only the first division, a histogram is used for division).

Step 3: In each of the resulting two areas, the amount of color change in each of the five directions is calculated, and the direction of maximum range is found.

Step 4: The area is divided into two in the maximum range direction. This provides three areas (for the second and later divisions, the area is divided at the center of the range).

Step 5: In each of the resulting three areas, the amount of color change in each of the five directions is calculated, and the direction of maximum range is found. If the maximum range is sufficiently small, further area division does not take place (three-color mode), otherwise, a further division takes place (four-color mode), and the division ends.

When division through the above-described steps is complete, color processing unit 4 calculates an average of colors included in each area (for the tags, by rule of majority), and determines the resulting color to be the representative color. Compression is done by recording the representative color found here and recording to which group each pixel belongs.

Though the color space has been described as a CMYK space in the foregoing, color reduction may be done in a tag color space and a simple uniform color space (L, r_g, b, k) as a specific example of color spaces.

Figure 5:
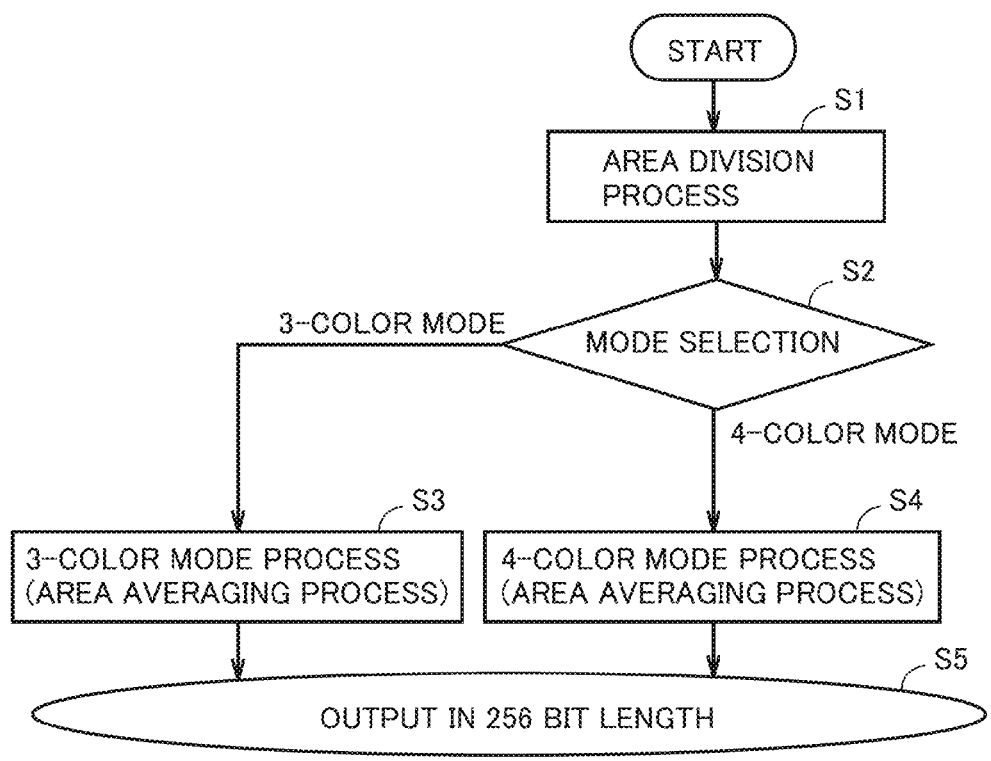
FIG. 5 is a flowchart representing a specific example of compression process that takes place in a color processing unit of the image processing system in accordance with the first embodiment.

Referring to FIG. 5, the flow of compression process performed by color processing unit 4 in accordance with the first embodiment will be described. Referring to FIG. 5, at step S1, color processing unit 4 executes an area division process on the color image data, which is CMYK data, input from PC 2 and divided to blocks of a prescribed size. At step S2, color processing unit 4 selects the color mode for area averaging process as the compression process on the block of interest, from the three-color mode and the four-color mode. If the three-color mode is selected at step S2, color processing unit 4 executes the three-color mode process as the area averaging process, at step S3. If the four-color mode is selected at step S2, color processing unit 4 executes the four-color mode process as the area averaging process, at step S4. Then, at step S5, color processing unit 4 outputs the image data that has been compressed by the three-color mode process at step S3 or the image data that has been compressed by the four-color mode process at step S4, in a data format having the bit length of 256 bits.

<Details of Color Reduction Process Algorithm—Area Division Process>

Figure 6:
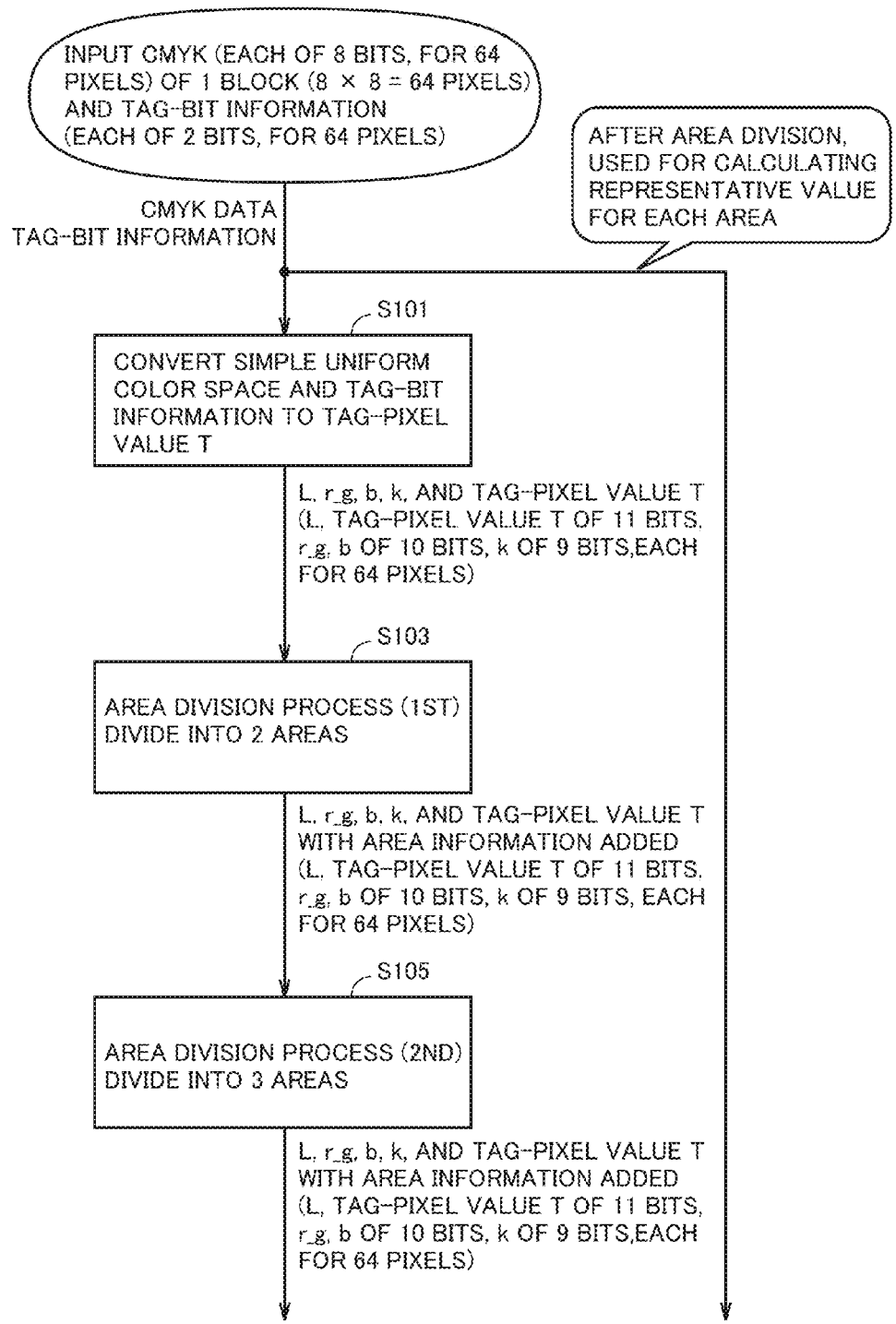
FIG. 6 is a flowchart representing a specific example of an area division process, as a part of the process shown in FIG. 5.

Referring to FIG. 6, the flow of area division process at step S1 will be described. At step S1, color processing unit 4 performs the process of converting color values of CMYK data to simple uniform color space (L, r_g, b, k) and the tag-bit information to tag-pixel value T, and the process of area division. More specifically, referring to FIG. 6, color processing unit 4 receives inputs of color values of CMYK data, 8 bits each, and tag-bit information, 2 bits each, for one block, that is, 8 pixels×8 pixels=64 pixels. At step S101, color processing unit 4 develops the color values of CMYK to a three-dimensional color space formed of L value, r_g value and b value, rather than the RGB color space, in order to enable appropriate weighting, as will be described later. The L value represents (rough) lightness, the r_g value represents redness-greenness, and the b value represents yellowness-blueness. At step S103, color processing unit 4 executes the first area division process, by which the block is divided into two areas. At step S105, color processing unit 4 performs the second area division process, in which one of the two areas resulting from the division at step S103 is divided, whereby the block is divided to three areas.

Specifically, at step S101, color processing unit 4 converts the color values of CMYK data to r, g and b values using Equations (1) below, taking into consideration ink and toner characteristics. Equations (1) correspond to reverse UCR conversion:

$$r=(255-c)*(255+inUCRp-k)/256,$$

$$g=(255-m)*(255+inUCRp-k)/256,$$

$$b=(255-y)*(255+inUCRp-k)/256 \quad (1)$$

where the coefficient in UCRp in Equations (1) is introduced in consideration of the fact that color hue changes if the value c, m or y changes even if the value k is 100%, and here it is set to in UCRp=30.

Next, color processing unit 4 converts the r, g and b values to a three-dimensional space (L, r_g, b) in accordance with Equations (2):

$$L=(r+g)*Weight\_Li/2 \text{//corresponding to lightness,}$$

$$r\_g=(r+255+inUCRp-g)*Weight\_r\_gi/2\text{//corresponding to redness-greenness,}$$

$$b=b*Weight\_bi\text{//corresponding to yellowness-blueness} \quad (2)$$

where coefficients Weight_Li, Weight_r_gi and Weight_bi are weight coefficients corresponding to the lightness, redness-greenness and yellowness-blueness, respectively, and here, these are set to Weight_Li=4, Weight_r_gi=3 and Weight_bi=2.

If the image data is CMYK data, the actual hue is different from the definition used here. Therefore, it is often the case that while the colors actually change, the three-dimensional amounts used here are unchanged. In order to avoid the problem of improper color separation, the area is divided in a four-dimensional space including a signal k represented by Equation (3) below. It is noted, however, that the weight of value k is reduced, since values r, g and b already include the k component.

$$k=k*Weight\_Wki \quad (3)$$

where the coefficient in Equation (3) is a weight coefficient for black, which is set to Weight_Wki=2.

Next, reflecting the empirical rule that a change in lightness in a high-light portion is more noticeable than a change at a darker portion, color processing unit 4 corrects to enhance lightness at the high-light portion, using Equation (4) below:

$$L=L+(L-(Lmax-highlighRange))*(L-(Lmax-highlightRange))/highlightRange \quad (4)$$

where the coefficient Lmax in Equation (4) represents the maximum value of L, which is set to Lmax=(255+inUCRp)*Weight_Li, and further, highlightRange=32*Weight_Li. It is noted that correction here is applied only in the range of Lmax≧L>Lmax-highlightRange.

On the other hand, color processing unit 4 adds a value colorV reflecting the contents of tag-bit and corresponding to the color value information, to the tag-bit information in a manner as shown in FIG. 7, to realize weighting similar to other colors, using this value. Specifically, for a photograph represented by the 2-bits of tag-information "11", colorV=0 is added to the tag-bit information; for a chart represented by the 2-bits of tag-information "10", colorV=200 is added to the tag-bit information; and for a character represented by the 2-bits of tag-information "01", colorV=390 is added to the tag-bit information. For an un-used tag represented by tag-bit information of "00", the value colorV is not added. Then, color processing unit 4 converts the tag-bit information with the added value colorV to tag-pixel value T, using Equation (5) below:

$$\text{Tag-pixel value } T=colorV*Weight\_Tag \quad (5)$$

where the coefficient Weight_Tag is a weight coefficient for the tag, which is set to Weight_Tag=3.

The foregoing is the process of step S101 by color processing unit 4.

Next, the first area division process at step S103 will be described with reference to FIG. 8.

Figure 8:
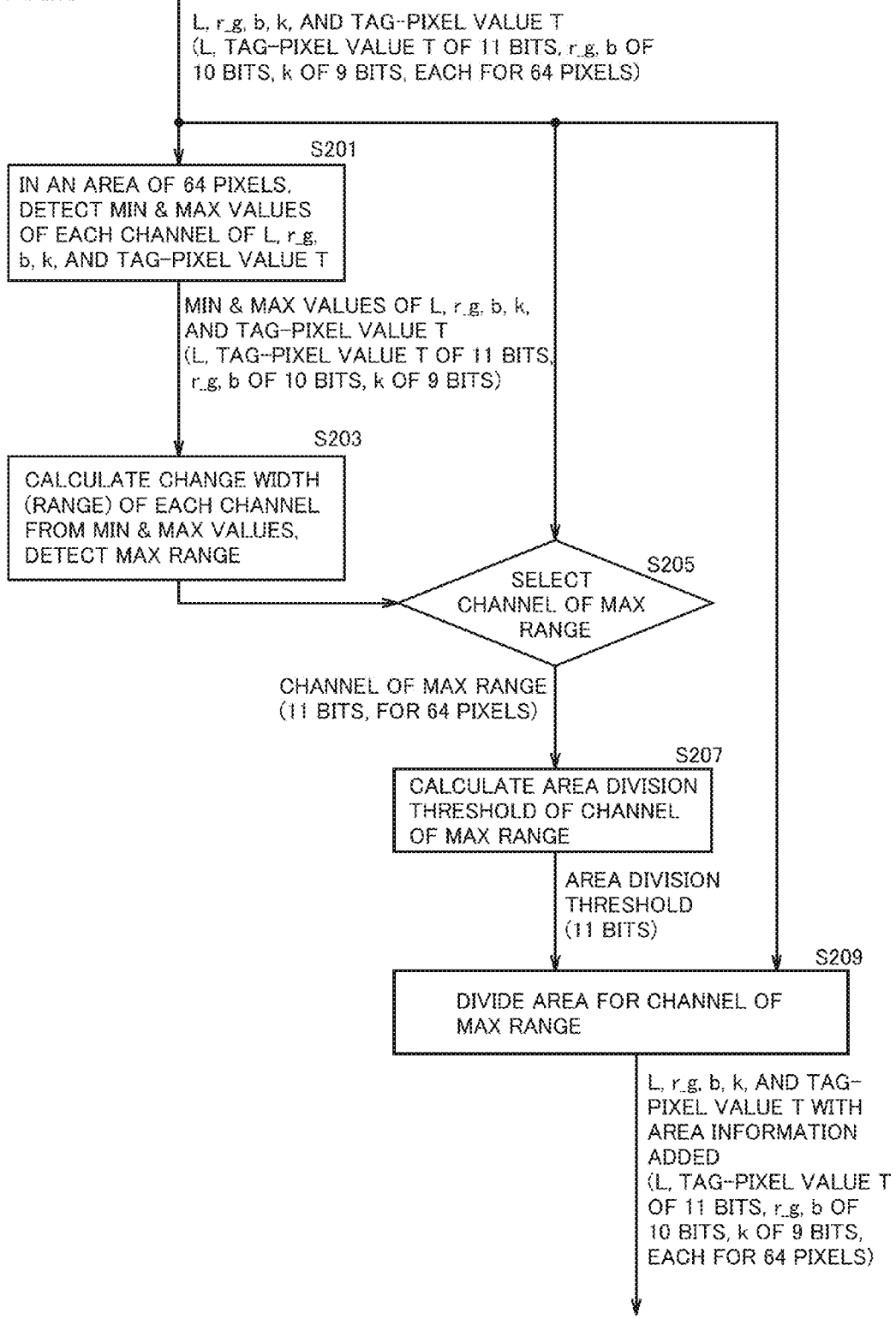
FIG. 8 is a flowchart representing a specific example of a first area division process as a part of the area division process.

Referring to FIG. 8, at step S201, color processing unit 4 detects the minimum and maximum values of each channel of L, r_g, b, k values and tag-pixel value T, from the area consisting of 64 pixels. At step S203, color processing unit 4 calculates, from the minimum and maximum values of L, r_g, b, k and tag-pixel value T detected at step S201, a width of change (range) of each value, range[ ], using Equations (6) below. Equations (6) are for calculating the width of change, in consideration of weights, for easier division.

$$range[0]=(inMax[1]-inMin[1])*(nGaso+15)../\text{/width of change (range) for } L$$

$$range[1]=(inMax[0]-inMin[0])*(nGaso+15)../\text{/width of change (range) for } r\_g$$

$$range[2]=(inMax[2]-inMin[2])*(nGaso+15)../\text{/width of change (range) for } b$$

range[3]=(inMax[3]−inMin[3])*($nGaso$+15)..//width of change (range) for $k$ range[4]=(inMax[4]−inMin[4])*($nGaso$+15)..//width of change (range) for tag-pixel value $T$ (6)

where the value nGaso represents the number of pixels included in the color area as an object of division.

At step S205, color processing unit 4 compares the ranges calculated at step S203, and detects a channel (axis corresponding to the value) that provides the maximum range. In the first division, it is assumed that 64 pixels all exist in one area, and the area is divided in a direction in which color distribution expands wider, that is, in the direction in which the changes in L, r_g, b, k values and tag-pixel value are large. Because of the weights represented by Equations (6), as the number of pixels increases, division tends to occur in the direction of r_g value than in the direction of b value, and in the direction of L value than in the direction of r_g value. If the width of change is the same, priority may be given to the range having smaller range number.

At step S207, color processing unit 4 calculates an area division threshold value of the channel that corresponds to the maximum range detected at step S205. The area division threshold value is, for example, the median of the range (average between the maximum and minimum values). At step S209, color processing unit 4 divides the area using the threshold value calculated at step S207, in the direction of the channel of maximum range detected at step S205. Color processing unit 4 adds area information such as "00" for AREA 0 and "01" for AREA 1 to the L, r_g, b and k values and to the tag-pixel value T of each pixel of the two areas (AREA 0, AREA 1) resulting from the division at step S209, and outputs the results.

By the execution of first area division process at step S103 as described above, CMYK data of the image shown on the upper right side of FIG. 3 is divided to two areas as shown in FIG. 9.

At step S105, the second area division process is performed, through a process substantially similar to the process shown in FIG. 8. In the second area division process, at step S203 of FIG. 8, color processing unit 4 calculates the width of change in the similar manner as in step S103 and thereby detects the maximum range. If the width of change is the same, the maximum range is determined in consideration of the area and the range number. Specifically, the maximum range is determined with priority given to the one having smaller area number and smaller range number.

At step S207, color processing unit 4 calculates the median ((maximum value+minimum value)/2) of the channel of maximum range detected at step S205, as the area division threshold value of the channel.

By the execution of second area division process at step S105 as described above, CMYK data after the first area division shown in FIG. 9 is divided to three areas as shown in FIG. 10.

<Details of Color Reduction Process Algorithm—Mode Selection>

Figure 11:
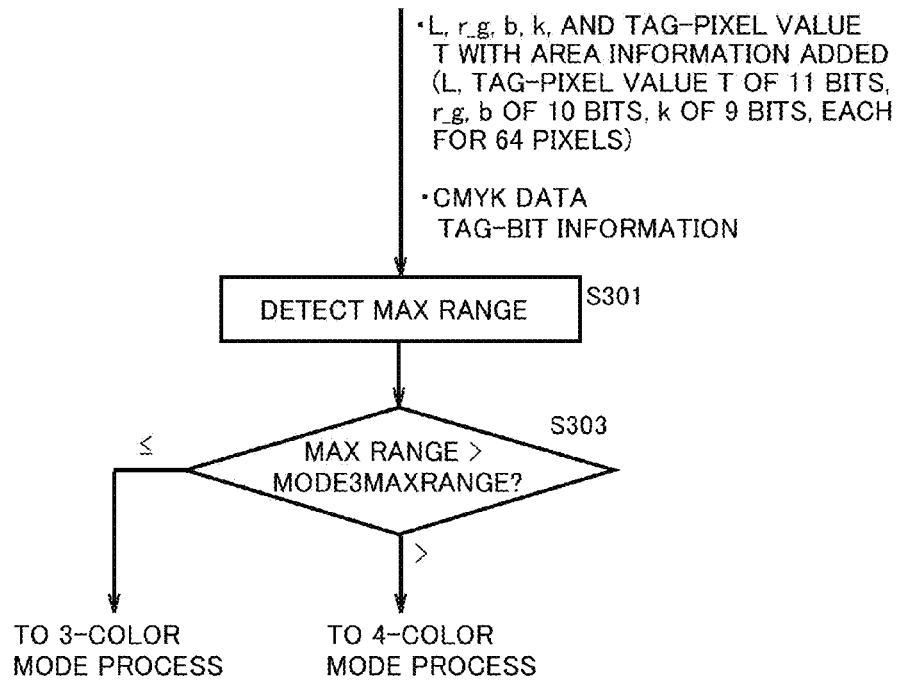
FIG. 11 is a flowchart representing a specific flow of mode selection as a part of the process shown in FIG. 5.

Referring to FIG. 11, a specific flow of mode selection at step S2 will be described. Referring to FIG. 11, at step S301, color processing unit 4 calculates, for the three areas divided at step S105 of Step S1, the widths of change (ranges) based on the minimum and maximum values of L, r_g, b, k and tag-pixel values T, compares all these ranges, and detects the maximum range therefrom. The method of calculation here may also be the same as at step S103 described above. If the width of change is the same, at step S301, the maximum range is determined in consideration of area and range numbers as at step S203. Specifically, the maximum range is determined with priority given to the one having smaller area number and smaller range number.

Then, at step S303, color processing unit 4 compares the maximum range detected at step S301 with a color difference MODE3MAXRANGE between the three-color mode and the four-color mode as the threshold value, and determines whether or not the maximum range is larger than the threshold value MODE3MAXRANGE. The determination here is performed in accordance with Equation (7), by which the weight added in calculating the maximum range is cancelled:

Maximum range>MODE3MAXRANGE*colorDifFactor (7)

where the coefficient colorDifFactor in Equation (7) is for canceling the weight added in calculating the maximum range, which is set to colorDifFactor=(nGaso+15)*3, and further the threshold value is set to MODE3MAXRANGE=10.

As a result of determination, if the maximum range is larger than the threshold value MODE3MAXRANGE, the four-color mode is selected as the color mode for compression process, and if it is smaller than the threshold value MODE3MAXRANGE, the three-color mode is selected.

<Details of Color Reduction Process Algorithm—Three-Color Mode Process>

Figure 12:
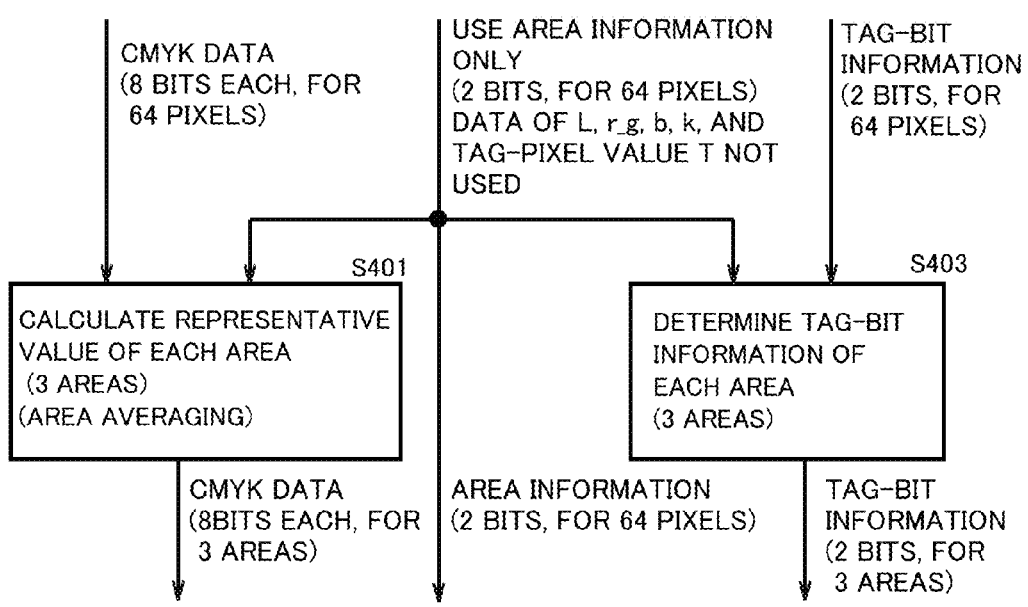
FIG. 12 is a flowchart representing a specific flow of a three-color mode process as a part of the process shown in FIG. 5.
Figure 13:
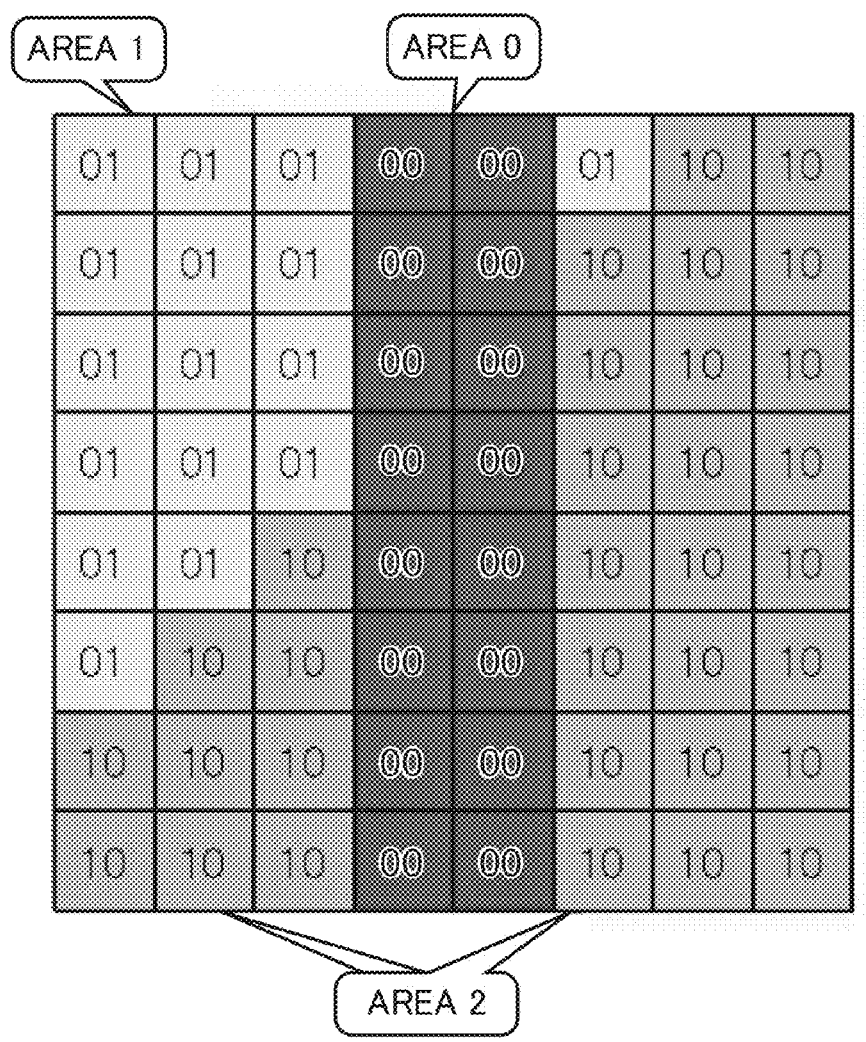
FIG. 13 shows the image of FIG. 10 after the three-color mode process.

Referring to FIG. 12, a specific flow of the three-color mode process at step S3 will be described. In the three-color mode, area division ends after two divisions, and representative values of CMYK data and tag-bit data of the three areas are calculated and output. More specifically, referring to FIG. 12, at step S401, color processing unit 4 calculates representative values of CMYK data of three areas divided at step S1, without any further area division. As a representative value, an average value of color values is calculated for each area. By the process at step S401, CMYK data of 1 block divided into three areas shown in FIG. 10 come to have color values of respective areas averaged, whereby the color data of 64 pixels (8 bits×4 colors×64 pixels=8192 bits) is compressed to color data of three areas (8 bits×4 colors×3 areas=96 bits).

At step S401, color processing unit 4 calculates representative values of three areas, including AREA 0 to AREA 2, using, for example, Equations (8) below:

Representative value of $C$=((sum of $C$ values)+(number of pixels)/2)/(number of pixels), Representative value of $M$=((sum of $M$ values)+(number of pixels)/2)/(number of pixels), Representative value of $Y$=((sum of $Y$ values)+(number of pixels)/2)/(number of pixels), Representative value of $K$=((sum of $K$ values)+(number of pixels)/2)/(number of pixels) (8)

where the term (number of pixels)/2 in Equations (8) is inserted for improving accuracy of round-off for averaging.

Figure 14:
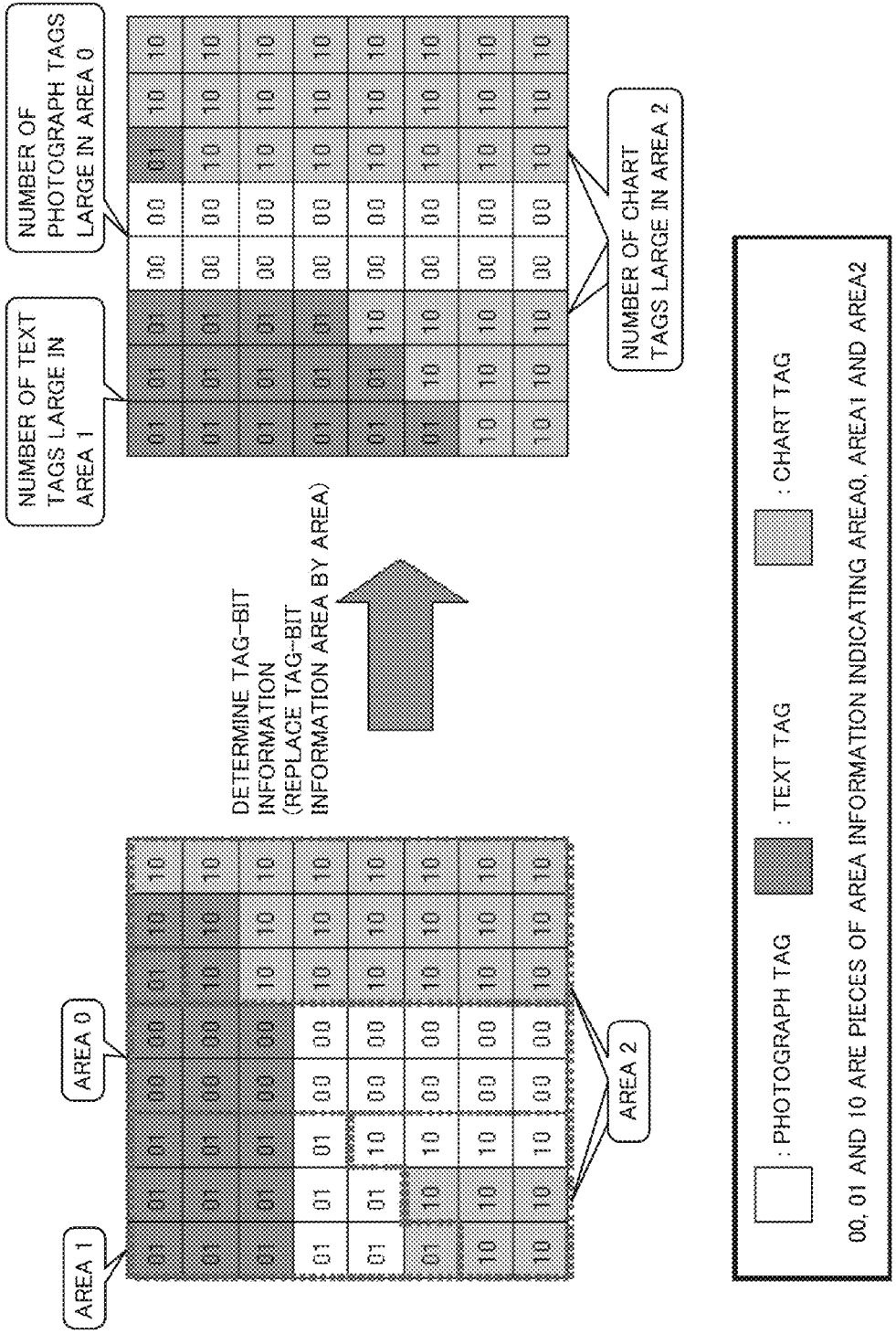
FIG. 14 illustrates a process related to tag bits.

At step S403, color processing unit 4 replaces the tag-bit information of each of the three areas divided at step S1, to determine the tag-bit information to be the representative of each area. Specifically, color processing unit 4 counts the number of pixels that correspond to the text tag, chart tag and photograph tag representing, text, chart and photograph in each area, and determines the tag-bit information representing each area by rule of majority. When the image shown on the left side of FIG. 3 is divided into three areas as shown in FIG. 10 at step S1, it follows that a plurality of different pieces of tag-bit information exist in each area, as shown on the left side of FIG. 14. Here, color processing unit 4 counts the number of pixels corresponding to each piece of tag-bit information in each area, and detects that the number of photograph tags is the largest in AREA 0, the number of text tags is the largest in AREA 1, and the number of chart tags is the largest in AREA 2. Then, color processing unit 4 replaces all pieces of tag-bit information in each area with the tag-bit information corresponding to the largest number of pixels, so that the tag-bit information is converted to one shown on the right side of FIG. 14. If the number of pixels is the same, priority is given to the text tag, chart tag and photograph tag in this order.

<Details of Color Reduction Process Algorithm—Four-Color Mode Process>

Figure 15:
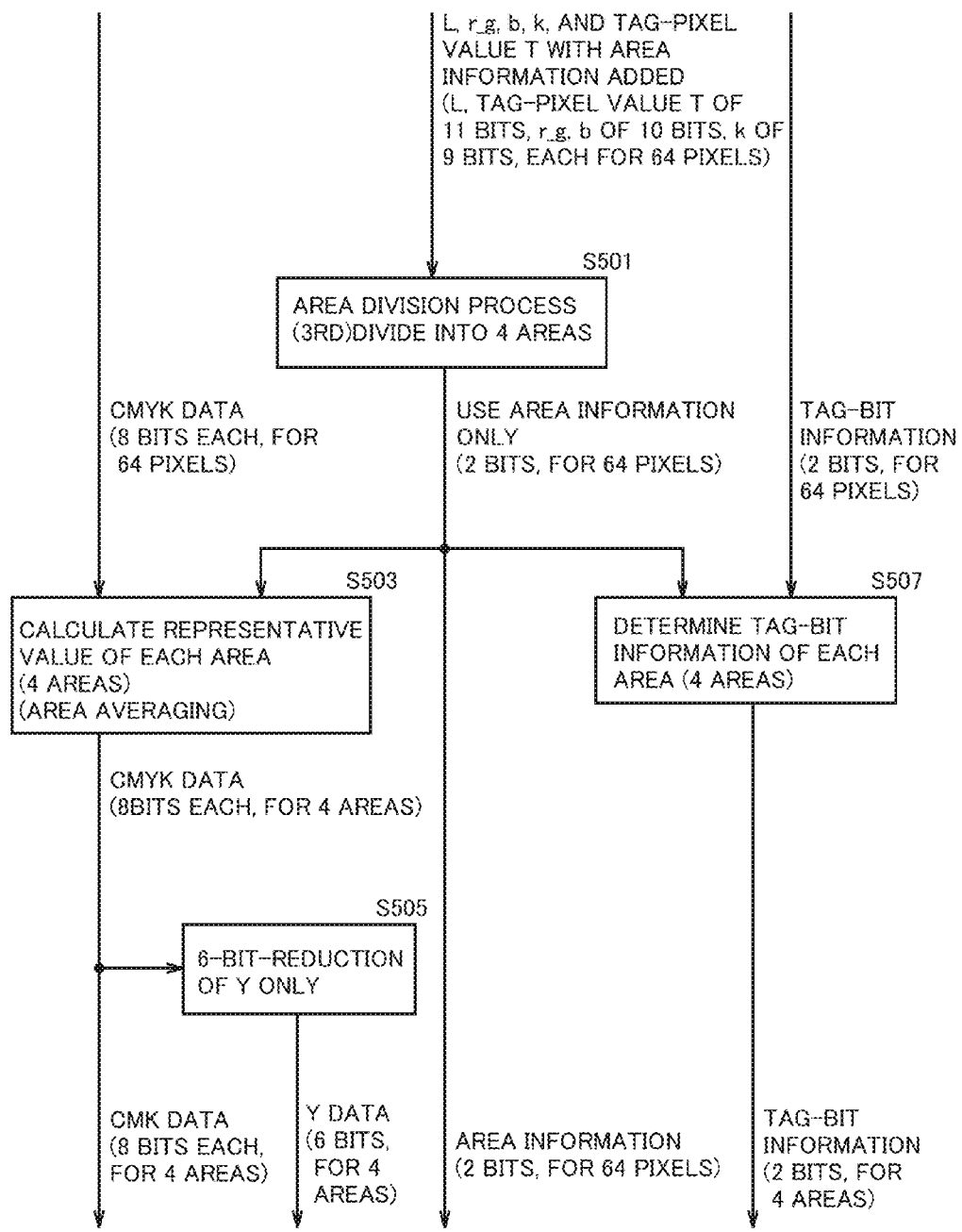
FIG. 15 is a flowchart representing a specific flow of a four-color mode process as a part of the process shown in FIG. 5.

Referring to FIG. 15, a specific flow of four-color mode process at step S4 will be described. In the four-color mode, a third area division is further conducted, and thereafter, representative values of CMYK data and tag-bit information of four areas are calculated and output. It is noted, however, that only the Y value among the representative values of CMYK data is set to have 6 bits. Specifically, referring to FIG. 15, at step S501, color processing unit 4 performs the third area division of further dividing the block, which has been divided into three at step S1, into four areas. The process at step S501 is the same as that of the second area division process at step S105 described above. Consequently, the CMYK data of one block that has been divided into three as shown in FIG. 10 is divided into four areas as shown in FIG. 16.

At step S503, color processing unit 4 calculates representative values of respective areas divided at step S501, in the similar manner as at step S401 described above. As a result, the CMYK data of one block divided into four areas as shown in FIG. 16 come to have color values of respective areas averaged, and the color data of 64 pixels (8 bits×4 colors×64 pixels=8192 bits) is compressed to color data of four areas (8 bits×4 colors×4 areas=128 bits).

Figure 18:
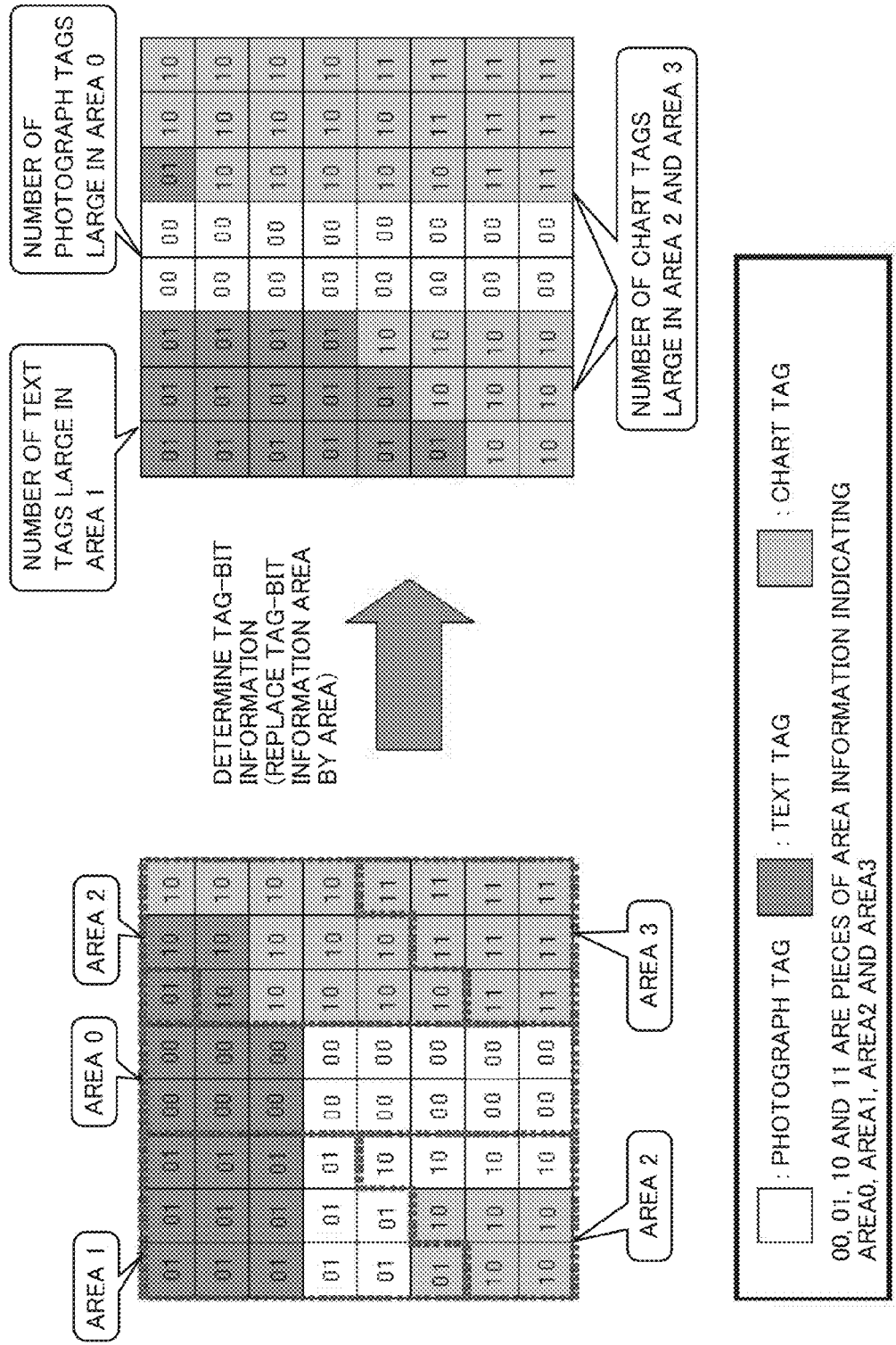
FIG. 18 illustrates a process related to tag bits.

At step S507, color processing unit 4 replaces the tag-bit information of each of the four areas divided at step S501 in the similar manner as at step S403 described above, to determine the tag-bit information to be the representative of each area. When the image shown on the left side of FIG. 3 is divided into four areas as shown in FIG. 16 at step S501, it follows that a plurality of different pieces of tag-bit information exist in each area, as shown on the left side of FIG. 18. Here, color processing unit 4 counts the number of pixels corresponding to each piece of tag-bit information in each area, and detects that the number of photograph tags is the largest in AREA 0, the number of text tags is the largest in AREA 1, and the number of chart tags is the largest in AREA 2 and AREA 3. Then, color processing unit 4 replaces all pieces of tag-bit information in each area with the tag-bit information corresponding to the largest number of pixels, so that the tag-bit information is converted to one shown on the right side of FIG. 18. If the number of pixels is the same, priority is given to the text tag, chart tag and photograph tag in this order.

It is noted, however, that the data amount of image data corresponding to one block resulting from the process described above is the sum of index data amount for each area of 2 bits×64 pixels=128 bits, color data amount of four areas of 4 colors×8 bits×4 areas=128 bits, and the tag-bit information data amount of 2 bits×4 areas=8 bits, that is, a total of 264 bits, which is larger than the data transfer unit of 256 bits. Therefore, at step S505, color processing unit 4 converts only the Y value among the color data of respective areas to data consisting of 6 bits (hereinafter referred to as 6-bit-reduced data). The 6-bit-reduced data represents data formed of 6 bits of 0 to 63.

Figure 19:
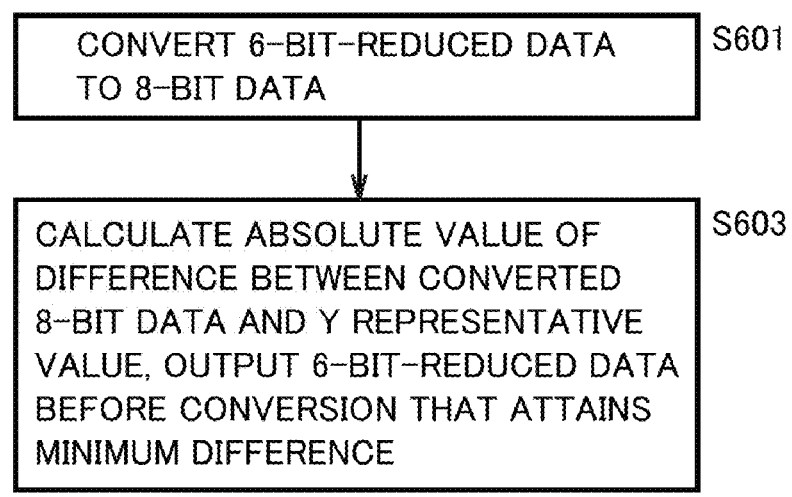
FIG. 19 is a flowchart representing a specific flow of a process for converting a Y value to 6-bit-reduced data, as a part of four-color mode process.
Figure 20:
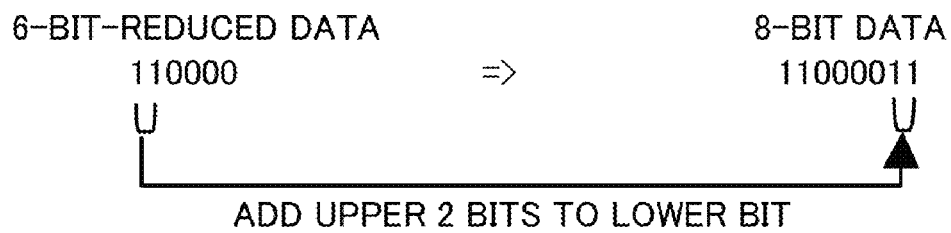

Using FIG. 19, the flow of the process at step S505 will be described. Referring to FIG. 19, at step S601, color processing unit 4 adds two bits that are the same as the most significant two bits of the 6-bit-reduced data to the least significant two bits as shown in FIG. 20, whereby all 6-bit-reduced data are converted to data of 8 bits. FIG. 21 shows values that result from data conversion of all 6-bit-reduced data to the data of 8 bits, in thick boxes. The data of 8 bits corresponding to all 6-bit-reduced data shown in FIG. 21 may be calculated at step S601, or may be stored beforehand as a table in color processing unit 4. The values in parentheses in FIG. 21 represent values of 8-bit data in decimal notation.

At step S603, color processing unit 4 calculates a difference between the data of 8 bits converted at step S601 and the representative value of Y calculated at step S503, as shown in FIG. 21, finds the data of 8 bits of which difference has the minimum absolute value, and outputs the 6-bit-reduced data before conversion that corresponds to the thus found data. At step S603, difference between each of the data of 8 bits obtained by conversion of 6-bit-reduced data, shown in thick boxes in FIG. 21, and the representative value of Y is calculated, and the 6-bit-reduced data before conversion, corresponding to that data of 8 bits which provides the minimum absolute value of difference, is output. By way of example, if the representative value of Y is "62", which is represented by 8 bits of data "00111110", the absolute value of difference from 8 bits of data "00111100", which is converted from 6-bit-reduced data of "001111" is the smallest. Therefore, the 6-bit-reduced data "001111" before conversion is output (Example 1 of FIG. 21). If the representative value of Y is "193", which is represented by 8 bits of data "11000001", the absolute value of difference from 8 bits of data "11000011", which is converted from 6-bit-reduced data of "110000" is the smallest. Therefore, the 6-bit-reduced data "110000" before conversion is output (Example 2 of FIG. 21).

The method of 6-bit-reduction is not limited to the above, and other method may be used. The simplest possible method is to cancel least significant two bits of the representative value of Y calculated at step S503, represented by 8 bits of data. Alternatively, 6-bit-reduced data having smallest difference from each of all values that may be the representative value of Y represented by 8 bits of data may be stored in advance in the form of a table, and the 6-bit-reduction may be done using the table.

By performing the process described above, the color data of four areas come to be 8 bits×3 colors×4 areas+6 bits×1 color×4 areas=120 bits. Thus, the image data of one block is compressed to a total of 256 bits. Namely, it is compressed to be within the data amount of 256 bits as the data transfer unit.

<Details of Color Reduction Process Algorithm—Data Format of 256 Bit Length>

Figure 22:
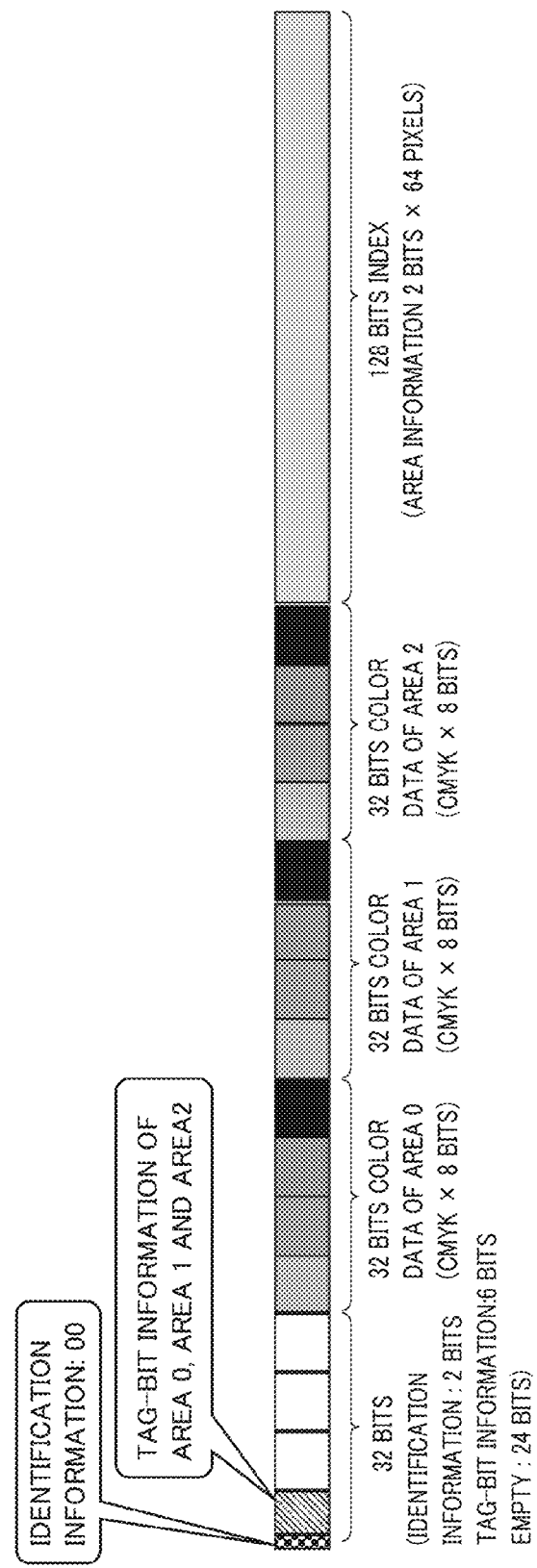
FIGS. 22 and 23 show specific examples of data formats having 256 bit length, after the three-color mode process and four-color mode process, respectively, in the compression process in accordance with the first embodiment.
Figure 23:
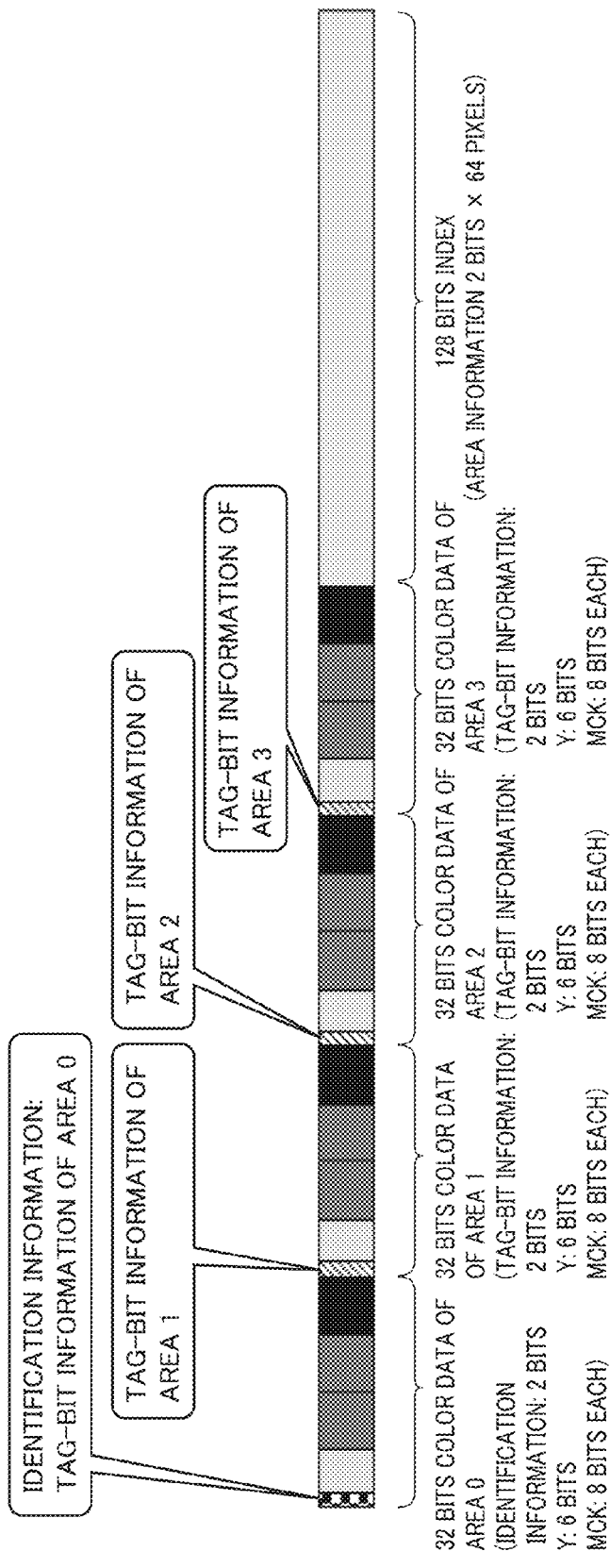

FIGS. 22 and 23 show specific examples of data formats having 256 bit length, output at step S5. FIG. 22 shows a specific example of data format of data after the three-color mode process at step S3, and FIG. 23 shows a specific example of data format of data after the four-color mode process at step S4.

Referring to FIG. 22, when the three-color mode process is done at step S3 on the input image data, identification information (2 bits) for identifying the color mode and tag-bit information of respective areas (2 bits×3 areas) are stored in most significant 32 bits of the output data format, and the remaining 24 bits are left as empty bits. The succeeding bits store color data of respective areas, each in 32 bits (8 bits×4 colors), and remaining 128 bits store indexes (2 bits×64 pixels).

Referring to FIG. 23, when the four-color mode process is done at step S4 on the input image data, tag-bit information (2 bits) and color data (8 bits×3 colors+6 bits×1 color) are stored in this order as information of respective areas in every 32 bits from the most significant bit of output data format, and the indexes (2 bits×64 pixels) are stored in the remaining 128 bits.

As described above, regardless of which color mode is used for the compression process, the data amount of image data after compression is 256 bits, which is within the data transfer unit of 256 bits. When the four-color mode process is done at step S4, however, the Y value among the representative color values of each area is represented by 6 bits. Therefore, in order to reproduce the transferred data, it is necessary to convert the 6-bit-reduced data to 8-bit data. For this purpose, at the time of reproducing the transferred data, determination as to whether the data has been compressed by the three-color mode process or by the four-color mode process must be made possible. Therefore, as shown in FIG. 23, the tag-bit information of AREA 0 is stored in the most significant 2 bits of the data compressed by the four-color mode process. It is assumed that the types of tag-bit information is three, including, for example, text tag "01", chart tag "10" and photograph tag "11". Here, the data empty information of "00" is stored as the identification information of data compressed by the three-color mode process, in the most significant 2 bits, as shown in FIG. 22. Thus, in reproducing the data, if it is found after scanning the most significant 2 bits that the tag-bit information "01", "10" or "11" of 2 bits representing any of the tags is stored, the data is determined to be the data compressed by the four-color mode process, and if "00" as other information of 2 bits is stored, the data is determined to be the data compressed by the three-color mode process.

Second Embodiment

In the second embodiment, in order to further compress the data size, color information is provided as RGB data to be subjected to the compression process. The unit of data transfer is set to 128 bits.

<Principle of Compression>

The principle of compression by color processing unit 4 in accordance with the second embodiment will be described, specifically assuming that one block consists of 5 pixels×5 pixels=25 pixels. In the second embodiment also, color processing unit 4 switches between the four-color mode process and the three-color mode process, block by block. In the four-color mode process in accordance with the second embodiment, reduction is done to represent one color in 19 or 20 bits. In the compression process in accordance with the second embodiment, the tag-bit information is not added to the data after compression. Further, conversion to simple uniform color space (L, r_g, b) is not performed.

<Outline of Color Reduction Algorithm>

Figure 24:
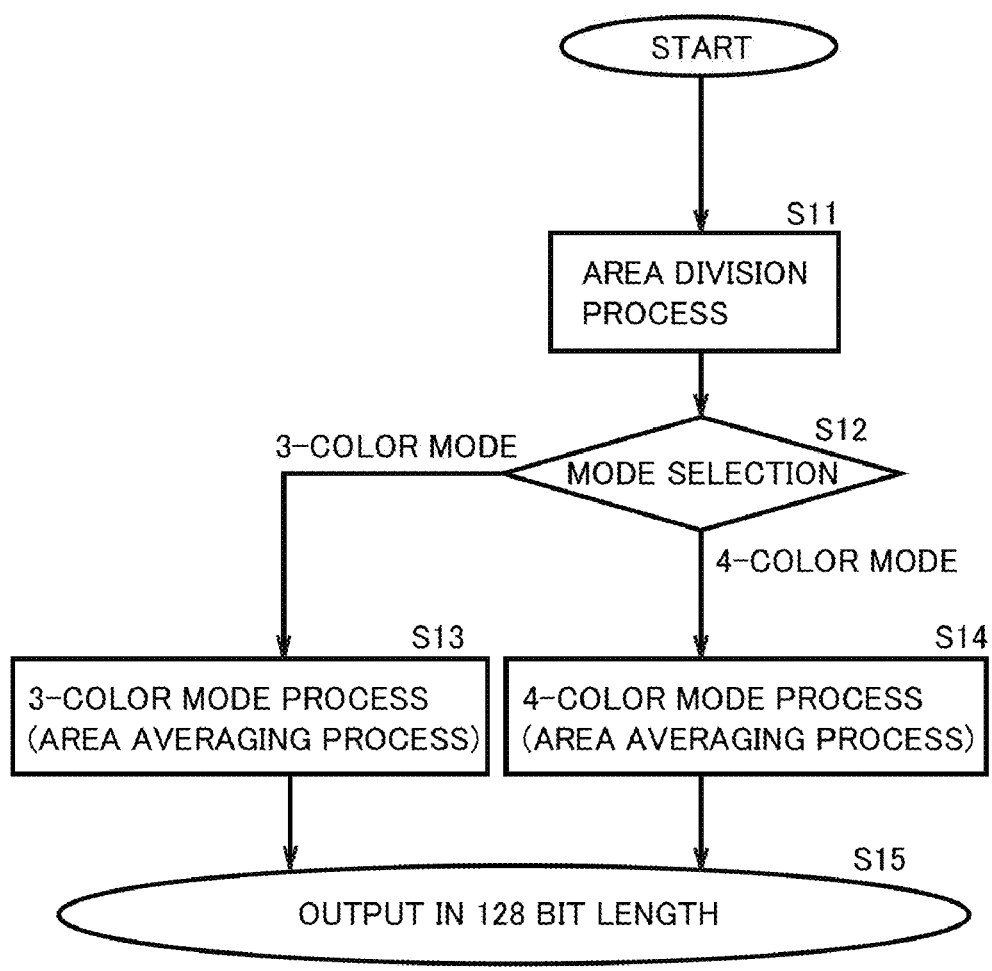
FIG. 24 is a flowchart of a specific example of a compression process performed by a color processing unit in the image processing system in accordance with the second embodiment.

Using FIG. 24, the flow of compression process performed by color processing unit 4 in accordance with the second embodiment will be described. Referring to FIG. 24, at step S11, color processing unit 4 executes an area division process on color image data of RGB input from PC 2 and divided into blocks of a prescribed size, and at step S12, selects the color mode for area averaging process as the compression process on the block, from the three-color mode and the four-color mode. If the three-color mode is selected at step S12, color processing unit 4 performs the three-color mode process as the area averaging process at step S13. If the four-color mode is selected at step S12, color processing unit 4 performs the four-color mode process as the area averaging process at step S14. At step S15, color processing unit 4 outputs the image data compressed by the three-color mode process at step S13 or the image data compressed by the four-color mode process at step S14, in a data format having the bit length of 128 bits.

<Details of Color Reduction Process Algorithm—Area Division Process>

At step S11, color processing unit 4 twice performs the area division process of dividing the image data at the center of the range on RGB data of one block, similar to the process of step S105 described above. It is noted, however, that at step S11, both in the first and second divisions, the channel processed by color processing unit 4 is three channels of R, G and B, and the ranges (width of change) of respective channels are calculated using Equations (9) below:

$$\text{range}[0] = (\text{inMax}[0] - \text{inMin}[0]) // \text{width of change (range) for } R$$

$$\text{range}[1] = (\text{inMax}[1] - \text{inMin}[1]) // \text{width of change (range) for } G$$

$$\text{range}[2] = (\text{inMax}[2] - \text{inMin}[2]) // \text{width of change (range) for } B \quad (9)$$

<Details of Color Reduction Process Algorithm—Mode Selection>

At step S12, color processing unit 4 performs mode selection by a process similar to that of step S2 described with reference to FIG. 11 above. Specifically, at step S12, color processing unit 4 calculates the change width (range) from minimum and maximum values of each of RGB values, for each of the three areas divided at step S11 described above, compares all the ranges, and detects the maximum range therefrom. Then, whether the maximum range is larger than the color difference MODE3MAXRANGE between the three-color mode and the four-color mode is determined. As the threshold value MODE3MAX RANGE, 10 is used as in the first embodiment. If the maximum range is larger than MODE3MAXRANGE as a result of determination, the four-color mode is selected as the color mode for the compression process, and if it is smaller than the threshold value MODE3MAXRANGE, the three-color mode is selected.

<Details of Color Reduction Process Algorithm—Three-Color Mode Process>

If the three-color mode is selected at step S12, at step S13, color processing unit 4 calculates and outputs the representative values of respective areas without any further area division, on the RGB data that have been divided into three areas at step S11. As a representative value, an average of color values is calculated for each area. By the process of step S13, the RGB data of 1 block is compressed from color data of 25 pixels (8 bits×3 colors×25 pixels=600 bits) to color information of three areas (8 bits×3 colors×3 areas=72 bits).

<Details of Color Reduction Process Algorithm—Four-Color Mode Process>

If the four-color mode is selected at step S12, at step S14, color processing unit 4 performs the third area division process in which the block, which has been divided into three areas at step S11, is further divided into four areas, and thereafter, calculates the average of color values of each area, to provide a representative value. At step S14, the color values, each of 8 bits, are converted to values of 7 bits or 6 bits, as needed. As to which of R, G and B values as representative values of respective areas should be converted to 7 bits or 6 bits is stored in advance as an output format. The conversion to 7 bits is realized by omitting the least significant bit of the color value represented by 8 bits of data. The conversion to 6 bits is realized by the method similar to the method of reducing Y value to 6 bits of data in the first embodiment.

<Details of Color Reduction Process Algorithm—Data Format of 128 Bit Length>

Figure 25:
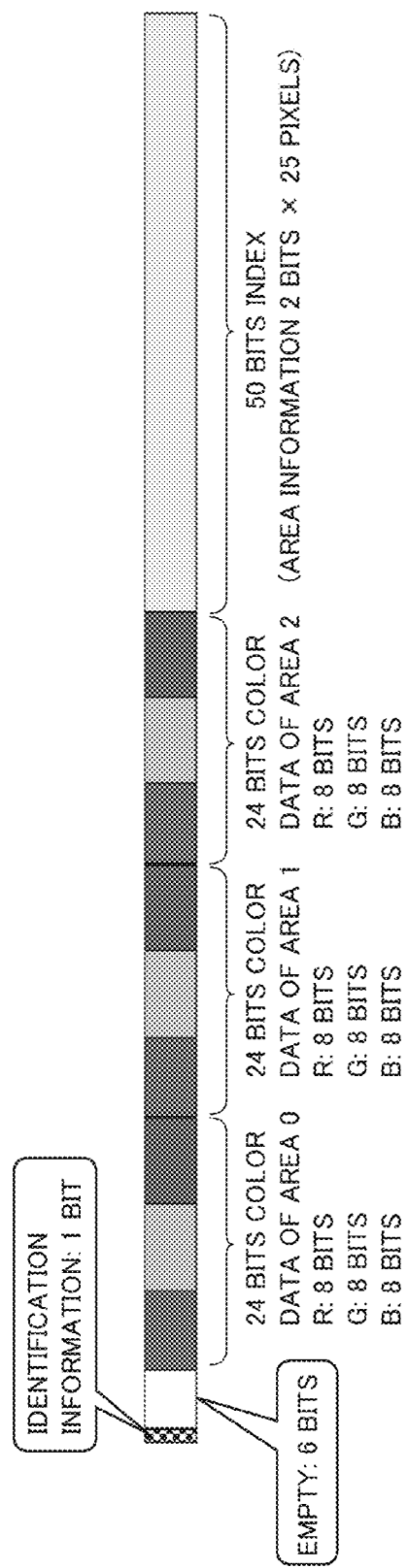
FIGS. 25 and 26 show specific examples of data formats having 128 bit length after three-color mode process and four-color mode process, respectively, in the compression process in accordance with the second embodiment.
Figure 26:
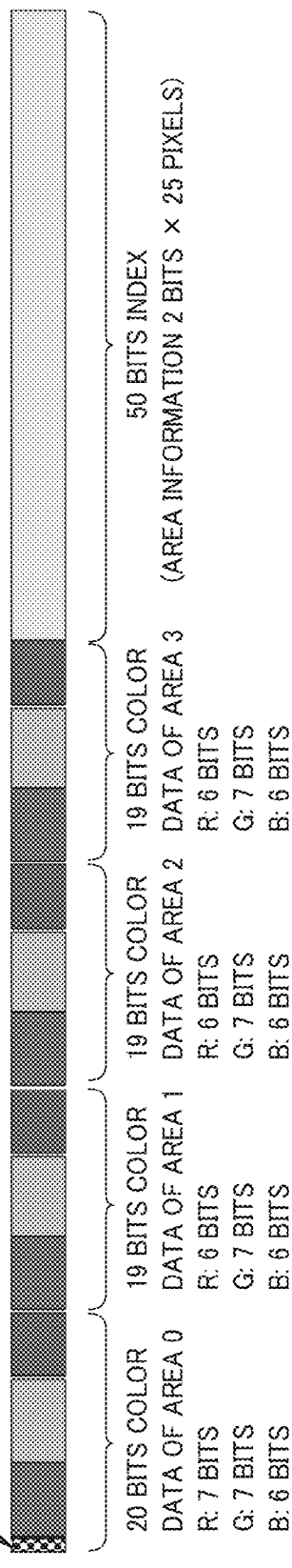

FIGS. 25 and 26 show specific examples of data format having the bit length of 128 bits, output at step S15. FIG. 25 shows a specific example of data format after the three-color mode process at step S13, and FIG. 26 shows a specific example of data format after the four-color mode process at step S14.

Referring to FIG. 25, when the three-color mode process is done at step S13 on the input image data, the most significant 1 bit of the output data format stores identification information (1 bit) identifying the color mode, succeeding 6 bits are left as empty bits, following bits store color data (8 bits×3 colors) of respective areas, each in 24 bits, and the remaining 50 bits store the indexes (2 bits×25 pixels).

Referring to FIG. 26, when the four-color mode process is done at step S14 on the input image data, the most significant 1 bit of the output data format similarly stores the identification information (1 bit), succeeding bits store the color data of respective areas, each in 20 or 19 bits, and the remaining 50 bits store the indexes (2 bits×25 pixels). In the example shown in FIG. 26, the color information of AREA 0 is represented by a total of 20 bits, including R and G values each of 7 bits and the B value of 6 bits, and color data of AREA 1 to AREA 3 are each represented by a total of 19 bits including R and B values each of 6 bits and G value of 7 bits.

By the process above, when the three-color mode process is done, the image data of one block is compressed to 122 bits, and output in the format having the bit length of 128 bits, which is good for transfer. When the four color mode process is done, the image data is compressed to 128 bits and output.

Further, it is also possible to provide a program causing a computer to execute the compression process described above. Such a program may be stored in a computer readable recording medium to be attached to the computer such as a flexible disk, a CD-ROM (Compact Disk-Read Only Memory), an ROM (Read Only Memory), an RAM (Random Access Memory) or a memory card and provided as a program product. Alternatively, the program may be provided recorded on a recording medium built in the computer. Further, the program may be provided by downloading from a network.

The program in accordance with the present invention may be adopted to call necessary ones of program modules provided as parts of an operating system of the computer in a prescribed sequence at prescribed timings, to execute the process. In that case, the modules mentioned above are not included in the program itself, and the process is executed in cooperation with the OS. Such a program that does not include the modules is also encompassed as the program in accordance with the present invention.

Further, the program in accordance with the present invention may be provided incorporated as a part of another program. In that case also, the modules included in said another program are not included in the program itself, and the process is executed in cooperation with the said another program. Such a program incorporated in another program is also encompassed by the present invention.

The provided program product is executed, installed in a program storage such as a hard disk. The program product includes the program itself and the recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of processing input image data in an image processing apparatus, comprising:

dividing a block of a prescribed size of said input image data into a plurality of areas;

calculating, for each of said divided areas, a representative color of said area; and representing said block as output data including a color palette indicating said representative color and information indicating the area to which each pixel in said block belongs, and outputting the output data; wherein at said step of dividing into areas, for each block of said input image data, the number of areas after division of said block is determined, and the block is divided into the determined number of areas;

at said step of dividing into areas, each said block of said input data is divided by selecting one mode from at least two different types of modes including a first mode of dividing into a prescribed number of areas and a second mode of dividing into areas larger in number than said first mode; and at said step of outputting, said output data, in which each of representative colors in said second mode is represented by a smaller amount of data than each of representative colors in said first mode, is output.

2. The image processing method according to claim 1, wherein at said step of dividing into areas, the block is divided into two areas by dividing pixels in the block in a direction in which distribution of chromaticity values is larger than distributions in other directions of the block.

3. The image processing method according to claim 1, wherein at said step of dividing into areas, chromaticity value of the block is developed to color space coordinates, and one mode is selected from said at least two different types of modes, based on size of distribution obtained by orthogonal projection of said chromaticity value to an axis of said color space coordinates.

4. The image processing method according to claim 1, wherein at said step of outputting, said block is represented by said output data having a data size of a numerical value given as a multiple of 32, and output.

5. The image processing method according to claim 1, wherein at said step of outputting, a difference between a value representing said representative color, and a value obtained by cancelling a lower bit of the color representation and adding an upper bit to a lower bit is calculated and, said representative color is represented by and output as a value attaining the smallest said difference, with said lower bit cancelled.

6. The image processing method according to claim 1, wherein at said step of outputting, said block is represented by and output as said output data including said color palette, information indicating an area to which each pixel in said block belongs, and image processing information utilized for a prescribed image processing performed in each of said area.

7. The image processing method according to claim 6, wherein said image processing information includes information related to color conversion process.

8. An image processing apparatus, comprising:
an input device for receiving input of image data; and
a processing device performing a process for compressing said image data, and outputting compressed data; wherein
said processing device compresses said image data by
(i) determining number of areas after division, for each block of a prescribed size of said input image data,
(ii) dividing said block into said determined number of areas,
(iii) calculating a representative color of the area, for each of said areas, and
(iv) representing said block as an output data including a color palette indicating said representative color and information indicating an area to which each pixel of said block belongs, and outputting the data as said compressed data;
wherein each said block of said input data is divided by selecting one mode from at least two different types of modes including a first mode of dividing into a prescribed number of areas and a second mode of dividing into areas larger in number than said first mode; and
said output data, in which each of representative colors in said second mode is represented by a smaller amount of data than each of representative colors in said first mode, is output.

9. A non-transitory computer readable medium recording a program causing a computer to execute a process on input image data, said process comprising:
dividing a block of a prescribed size of said input image data into a plurality of areas;
for each of said divided areas, calculating a representative color of the area; and
representing and outputting said block as output data including a color palette indicating said representative color and information indicating an area to which each pixel in said block belongs; wherein
at said step of dividing into areas, for each block of said input image data, the number of areas after division of said block is determined, and the block is divided into the determined number of areas;
at said step of dividing into areas, each said block of said input data is divided by selecting one mode from at least two different types of modes including a first mode of dividing into a prescribed number of areas and a second mode of dividing into areas larger in number than said first mode; and
at said step of outputting, said output data, in which each of representative colors in said second mode is represented by a smaller amount of data than each of representative colors in said first mode, is output.

10. A method of processing input image data in an image processing apparatus, comprising:
dividing a block of a prescribed size of said input image data into a plurality of areas;
calculating, for each of said divided areas, a representative color of said area; and
representing said block as output data including a color palette indicating said representative color and information indicating the area to which each pixel in said block belongs, and outputting the output data; wherein
at said step of dividing into areas, for each block of said input image data, the number of areas after division of said block is determined, and the block is divided into the determined number of areas; and
at said step of outputting, a difference between a value representing said representative color, and a value obtained by cancelling a lower bit of the color representation and adding an upper bit to a lower bit is calculated and, said representative color is represented by and output as a value attaining the smallest said difference, with said lower bit cancelled.

11. An image processing apparatus, comprising:
an input device for receiving input of image data; and
a processing device performing a process for compressing said image data, and outputting compressed data; wherein
said processing device compresses said image data by
(i) determining number of areas after division, for each block of a prescribed size of said input image data,
(ii) dividing said block into said determined number of areas,
(iii) calculating a representative color of the area, for each of said areas, and
(iv) representing said block as an output data including a color palette indicating said representative color and information indicating an area to which each pixel of said block belongs, and outputting the data as said compressed data
wherein a difference between a value representing said representative color, and a value obtained by cancelling a lower bit of the color representation and adding an upper bit to a lower bit is calculated and, said representative color is represented by and output as a value attaining the smallest said difference, with said lower bit cancelled.

12. A non-transitory computer readable medium recording a program causing a computer to execute a process on input image data, said process comprising:
dividing a block of a prescribed size of said input image data into a plurality of areas;
for each of said divided areas, calculating a representative color of the area; and
representing and outputting said block as output data including a color palette indicating said representative color and information indicating an area to which each pixel in said block belongs; wherein
at said step of dividing into areas, for each block of said input image data, the number of areas after division of said block is determined, and the block is divided into the determined number of areas;
at said step of outputting, a difference between a value representing said representative color, and a value obtained by cancelling a lower bit of the color representation and adding an upper bit to a lower bit is calculated and, said representative color is represented by and output as a value attaining the smallest said difference, with said lower bit cancelled.

* * * * *